(12) United States Patent
Abbey et al.

(10) Patent No.: US 9,844,868 B1
(45) Date of Patent: Dec. 19, 2017

(54) CART SYSTEM FOR TOOL MANIPULATION

(71) Applicants: Kenneth Robert Abbey, Lake Oswego, OR (US); Jennifer Carmel Swendsen, Lake Oswego, OR (US)

(72) Inventors: Kenneth Robert Abbey, Lake Oswego, OR (US); Jennifer Carmel Swendsen, Lake Oswego, OR (US)

(*) Notice: Subject to any disclaimer, the term of this patent is extended or adjusted under 35 U.S.C. 154(b) by 435 days.

(21) Appl. No.: 14/606,535

(22) Filed: Jan. 27, 2015

Related U.S. Application Data

(60) Provisional application No. 61/965,215, filed on Jan. 27, 2014.

(51) Int. Cl.
*B25D 17/32* (2006.01)

(52) U.S. Cl.
CPC .................................... *B25D 17/32* (2013.01)

(58) Field of Classification Search
CPC .............................. B25D 17/32; A47B 21/00
USPC .......... 173/22, 28, 39, 42, 84, 89, 90, 162.2, 173/152, 184, 186; 280/47.21
See application file for complete search history.

(56) References Cited

U.S. PATENT DOCUMENTS

| | | | |
|---|---|---|---|
| 2,622,562 | A | 12/1952 | Longenecker et al. |
| 2,776,653 | A | 1/1957 | Eaton et al. |
| 3,493,085 | A | 2/1970 | Libhart et al. |
| 3,828,392 | A | 8/1974 | Bolger |
| 4,155,527 | A * | 5/1979 | Sjoberg ..................... B62B 3/10 173/185 |
| 4,385,414 | A | 5/1983 | Damico |
| 4,548,279 | A | 10/1985 | Zaruba |
| 4,558,648 | A | 12/1985 | Franklin et al. |
| 4,637,475 | A * | 1/1987 | England .................. E21B 7/024 173/193 |
| 4,985,960 | A | 1/1991 | Zun |
| 4,986,370 | A | 1/1991 | Johnson et al. |
| 5,377,372 | A | 1/1995 | Rudolf et al. |
| 5,462,127 | A | 10/1995 | Svensson |
| 5,484,151 | A | 1/1996 | Tholkes |
| 5,649,422 | A | 7/1997 | Baginski et al. |
| 5,745,951 | A | 5/1998 | Waner |

(Continued)

FOREIGN PATENT DOCUMENTS

| | | |
|---|---|---|
| WO | WO1989001892 | 9/1989 |
| WO | WO2014005221 | 9/2014 |

OTHER PUBLICATIONS

Makinex, Makinex Jackhammer Trolley, at least as early as Sep. 25, 2014, http://makinex.com/products/makinex-jackhammer-trolley, 3 pages.

(Continued)

*Primary Examiner* — Nathaniel Chukwurah
(74) *Attorney, Agent, or Firm* — Law Office of Karen Dana Oster, LLC

(57) ABSTRACT

A manipulation cart system for manipulating a tool described herein includes a chassis subsystem, a locomotion subsystem, at least one manipulation subsystem, at least one attachment subsystem, and at least one control subsystem. The locomotion subsystem may include a turn pivot. The at least one manipulation subsystem may include at least one tilting subsystem. Preferably the cart system at least partially relieves the physical demands of manipulating the tool and at least partially protects from stress-induced injuries associated with manipulating the tool.

31 Claims, 10 Drawing Sheets

(56) References Cited

U.S. PATENT DOCUMENTS

| | | | |
|---|---|---|---|
| 6,050,345 | A | 4/2000 | Jarvinen et al. |
| 6,296,261 | B1 | 10/2001 | deGoma |
| 6,321,878 | B1 | 11/2001 | Mobley et al. |
| 6,865,775 | B2 | 3/2005 | Ganance |
| 7,044,423 | B2 | 5/2006 | Bober et al. |
| 7,607,491 | B2 | 10/2009 | Sorric et al. |
| 7,632,058 | B2 | 12/2009 | Ablabutyan et al. |
| 7,694,749 | B2 | 4/2010 | Sorric et al. |
| 7,810,822 | B2 | 10/2010 | Figel et al. |
| 8,240,682 | B2 | 8/2012 | Kennard |
| D668,420 | S | 10/2012 | Kennard |
| 8,910,326 | B2 | 12/2014 | Wilson |
| 2004/0144601 | A1* | 7/2004 | Otterson .................. B62B 5/04  188/19 |
| 2007/0228805 | A1 | 10/2007 | Due |
| 2013/0098649 | A1 | 4/2013 | Charbonneau et al. |

OTHER PUBLICATIONS

Makinex, Makinex Jackhammer Trolley Makes Floor Removal Easier Than Ever, at least as early as Feb. 26, 2014, http://www.makinex.com.au/blog/makinex-jackhammer-trolley-makes-floor-removal-easier-than-ever, 2 pages.

\* cited by examiner

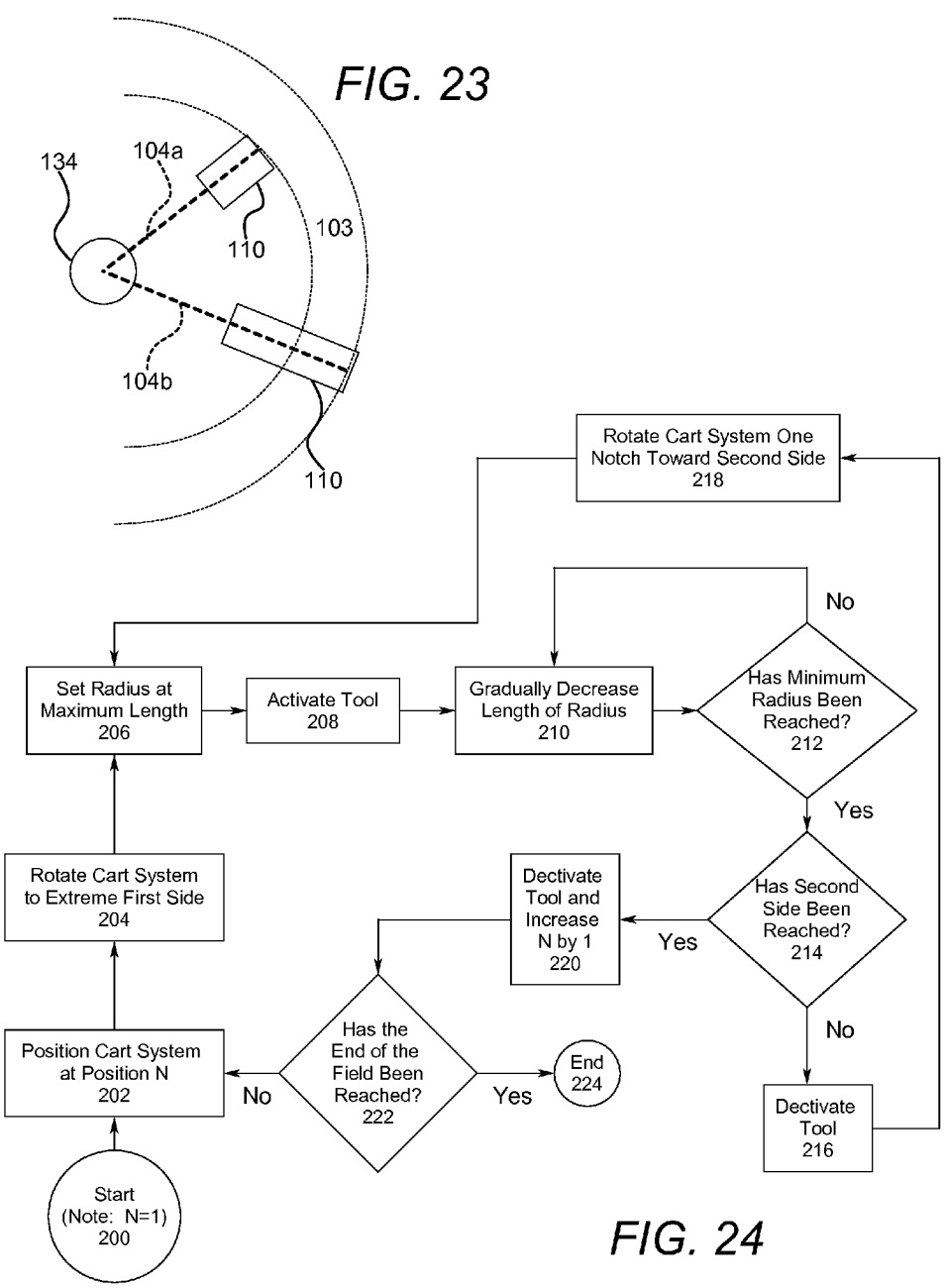

CART SYSTEM FOR TOOL MANIPULATION

The present application is an application claiming the benefit of U.S. Provisional Patent Application No. 61/965,215, filed Jan. 27, 2014. The present application is based on and claims priority from this application, the disclosure of which is hereby expressly incorporated herein by reference in its entirety.

BACKGROUND OF THE INVENTION

Described herein is a "cart system" that allows manipulation of tools (e.g. jackhammer tools) and, more specifically, a wheeled cart system having multiple subsystems (e.g. a lifting subsystem for lifting tools and a tilting subsystem for tilting tools) that relieve the operator from the physical demands of manipulating tools.

Jackhammer tools have been in use for over 150 years for good reason: they are a reasonably-priced, flexible alternative to hand tools for heavy demolition and construction work. In addition to providing a more powerful alternative to sledgehammers and pickaxes, jackhammer tools have led to the development of a family of related tools that are more efficient and less physically demanding than the hand tools they replace. This family of tools includes, for example, diggers, paving breakers, rock drills, tampers and rammers, pick hammers, post-drivers, ground rod drivers, post hole borers, post pullers, and breakers (collectively "jackhammer tool[s]"). While an improvement over hand tools, jackhammer tools exact a heavy price from operators in terms of the physical effort required and physical injuries inflicted. To be effective, jackhammer tools are heavy (typically 60-100 lbs.), extremely loud, and vibrate intensely when in use. As a result, jackhammer tools can be used only by physically fit and strong operators and for limited periods between rest breaks. Over time, operation of jackhammer tools is miserable, exhausting work that is sometimes known as "punishment work" in the trades. In addition, with time, operators experience a variety of injuries that lead to pain, disability, and inability to continue working with these tools. For some potential employees (e.g. most women), the physical demands of these tools function to exclude the potential employees from employment opportunities. For employers, the physical burdens and injuries inflicted by jackhammer tools increase the cost of doing business, lead to employee attrition, and delay work.

A number of technologies have been developed to address the problems and limitations associated with jackhammer tools, and a number of patents have issued for those technologies.

A first group of references disclose lift assist devices that provide mechanical means for lifting jackhammer tools off the ground.

In U.S. Pat. No. 2,622,562 to Longenecker (the "Longenecker reference"), Longenecker discloses a lift assist device consisting of a single acting hydraulic cylinder that, when activated, pushes directly against the working surface to lift the jackhammer tool off of the working surface. In addition to assisting the operator in lifting the heavy tool, the Longenecker device also assists operators in freeing tools that have become jammed in the working surface, a common occurrence with jackhammer tools.

In U.S. Pat. No. 2,776,653 to Eaton (the "Eaton reference"), Eaton discloses a lift assist with dual pneumatic jacks and a semicircular foot designed to better engage with the working surface. It also includes a retraction mechanism for the jacks.

In U.S. Pat. No. 4,548,279 to Zaruba (the "Zaruba reference"), Zaruba discloses a lift assist with a pneumatic jack that remains always in contact with the working surface.

In U.S. Pat. No. 4,986,370 to Johnson et al. (the "Johnson reference"), Johnson et al. disclose a pneumatic lift system that includes a lift plate that remains in contact with the working surface during operation.

In U.S. Pat. No. 6,050,345 to Jarvinen et al. (the "Jarvinen reference"), Jarvinen et al. disclose a lift assist that incorporates a single caster to assist in repositioning of the tool between periods of operation.

In U.S. Pat. No. 7,694,749 to Sorric et al. (the "Sorric reference"), the Sorric brothers disclose a jackhammer tool with integrated lift assist that has dual acting pneumatic cylinders that push against the working surface to lift the tool and retract when not lifting. In one embodiment of the Sorric device, they disclose a pair of small wheels that push against the working surface when lifting, and retract away from the working surface when the tool is operating.

A second group of references disclose devices that assist in the positioning of jackhammer tools by providing wheeled carts that support all or some of the weight of these jackhammer tools while they are being transported or repositioned.

In U.S. Pat. No. 8,240,682 to Kennard (the "Kennard reference"), Kennard discloses a jackhammer tool trolley that includes a frame with two wheels similar in design to a golf club pull cart. The trolley is designed to assist in transport of jackhammer tools and to permit operation of jackhammer tools while attached to the trolley and held at an angle to the working surface. The trolley supports most of the weight of the jackhammer tool, while held at an angle, assisting operators when using the jackhammer tool to remove floor tiles and similar flooring materials. The trolley does not include a mechanism for mechanical lifting of the jackhammer tool but does include a spring mechanism to provide some assistance in changing the angle of the jackhammer tool in relation to the working surface.

In U.S. Pat. No. 5,462,127 to Svensson (the "Svensson reference"), Svensson discloses another jackhammer tool trolley that incorporates four wheels and shock absorbers designed to reduce the vibration transmitted to the user. The tool is lifted from the working surface by manually tilting the trolley and tool toward the operator.

In U.S. Patent Publication No. 2007/0228805 to Due (the "Due reference"), Due discloses another jackhammer tool trolley that incorporates two driven wheels in a similar arrangement to the device disclosed by Kennard reference.

In PCT Publication No. WO 1989/001892 A1 to Frederick (the "Frederick reference"), Frederick discloses a powered cart with its weight balanced primarily over two powered wheels (but with two additional balance wheels where the skids would be in a wheelbarrow) in an arrangement similar to a two-wheeled wheelbarrow that is designed to carry and provide a power source for a variety of tools and implements, including a wheelbarrow tray, lawnmower, vacuum, chainsaw, concrete saw, or jackhammer tool. The drawings do not show a jackhammer tool, but the description specifies that the jackhammer tool is attached in a fixed position relative to the cart. Therefore, the jackhammer tool is lifted by manually tilting the cart over its main wheels.

In U.S. Patent Publication No. 2013/0098649 to Charbonneau et al. (the "Charbonneau reference"), Charbonneau discloses a support frame for jackhammer tools that includes support structures including wheels and "pods," a lever for lifting the jackhammer tool by pressing down on handles opposite the jackhammer tool in a teeter-totter arrangement, and a "joystick" for moving the jackhammer tool from side to side while lifting.

BRIEF SUMMARY OF THE INVENTION

Described herein is a "cart system" that allows manipulation of tools (e.g. jackhammer tools) and, more specifically, a wheeled cart system having multiple subsystems (e.g. a lifting subsystem for lifting tools and a tilting subsystem for tilting tools) that relieve the operator from the physical demands of manipulating tools.

Described herein is a manipulation cart system for manipulating a tool. The cart system includes a chassis subsystem, a locomotion subsystem, at least one manipulation subsystem, at least one attachment subsystem, and at least one control subsystem. The locomotion subsystem is preferably associated with the chassis subsystem. The at least one manipulation subsystem, which is preferably associated with the chassis subsystem, is for manipulating the tool. The at least one attachment subsystem is preferably for attaching the tool to the chassis subsystem. The at least one control subsystem, which is preferably associated with the chassis subsystem, is for actuating the at least one manipulation subsystem. Preferably the cart system at least partially relieves the physical demands of manipulating the tool and at least partially protects from stress-induced injuries associated with manipulating the tool.

The locomotion subsystem may include a turn pivot about which the cart system can pivot. The turn pivot may include a turn pivot shaft and a turn pivot grip. The turn pivot shaft may be rotatable in relation to the turn pivot grip. The turn pivot being raisable and lowerable. Further, the turn pivot may be raisable and lowerable using the at least one control subsystem. When the turn pivot is lowered it preferably provides a pivot point about which the cart system can pivot such that the tool moves in an arc defined by a radius defined by the turn pivot and the tool.

The at least one attachment subsystem may attach the tool to the chassis subsystem indirectly via the at least one manipulation subsystem. The at least one manipulation subsystem for manipulating the tool may include one or both of at least one lifting subsystem (for raising and lowering the tool) and at least one tilting subsystem (for tilting the tool). The at least one lifting subsystem may include a lift support frame, a lift telescoping element, and at least one lift strut. The lift strut is for raising and lowering the telescoping element in relation to the lift support frame. The at least one tilting subsystem may include a tilt support frame, a tilt brace, a tilt pivot, a tilt guide, a tilt bracket, and a tilt lock. The tilt support frame tilts about the tilt pivot relative to the tilt brace. The lift support frame may be attached to the tilt support frame. Alternatively, the lift support frame and the tilt support frame may be the same support frame.

The cart system may further include a positioning control subsystem that can selectively position the locomotion subsystem into at least three configurations including a free configuration, a first directional configuration, and a second directional configuration.

Also described herein is a first preferred manipulation cart system for manipulating a tool that includes a turn pivot. The cart system includes a chassis subsystem, a locomotion subsystem, at least one manipulation subsystem, at least one attachment subsystem, and at least one control subsystem. The locomotion subsystem is preferably associated with the chassis subsystem. The locomotion subsystem preferably includes a turn pivot about which the cart system can pivot. The at least one manipulation subsystem, which is preferably associated with the chassis subsystem, is for manipulating the tool. The at least one attachment subsystem is preferably for attaching the tool to the chassis subsystem. The at least one control subsystem, which is preferably associated with the chassis subsystem, is for actuating the at least one manipulation subsystem. Preferably the cart system at least partially relieves the physical demands of manipulating the tool and at least partially protects from stress-induced injuries associated with manipulating the tool. The at least one attachment subsystem may attach the tool to the chassis subsystem indirectly via the at least one manipulation subsystem.

Also described herein is a second preferred manipulation cart system for manipulating a tool. The cart system includes a chassis subsystem, a locomotion subsystem, at least one manipulation subsystem, at least one attachment subsystem, and at least one control subsystem. The locomotion subsystem is preferably associated with the chassis subsystem. The at least one manipulation subsystem, which is preferably associated with the chassis subsystem, is for manipulating the tool. The at least one manipulation subsystem includes at least one tilting subsystem that may include a tilt support frame, a tilt brace, a tilt pivot, a tilt guide, a tilt bracket, and a tilt lock. The tilt support frame tilts about the tilt pivot relative to the tilt brace. The at least one attachment subsystem is preferably for attaching the tool to the chassis subsystem.

The at least one control subsystem, which is preferably associated with the chassis subsystem, is for actuating the at least one manipulation subsystem. Preferably the cart system at least partially relieves the physical demands of manipulating the tool and at least partially protects from stress-induced injuries associated with manipulating the tool. The at least one attachment subsystem may attach the tool to the chassis subsystem indirectly via the at least one manipulation subsystem.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL
VIEWS OF THE DRAWINGS

The accompanying drawings illustrate various exemplary cart systems and/or provide teachings by which the various exemplary cart systems are more readily understood.

FIG. 23 is a schematic view of two exemplary radii between the turn pivot and the working point of a tool, and the arc of demolition created by the rotation of the cart system as well as the lifting/lowering and tilting of the tool.

FIG. 24 is a flowchart of an exemplary method using the tool and cart system.

Figure 1:
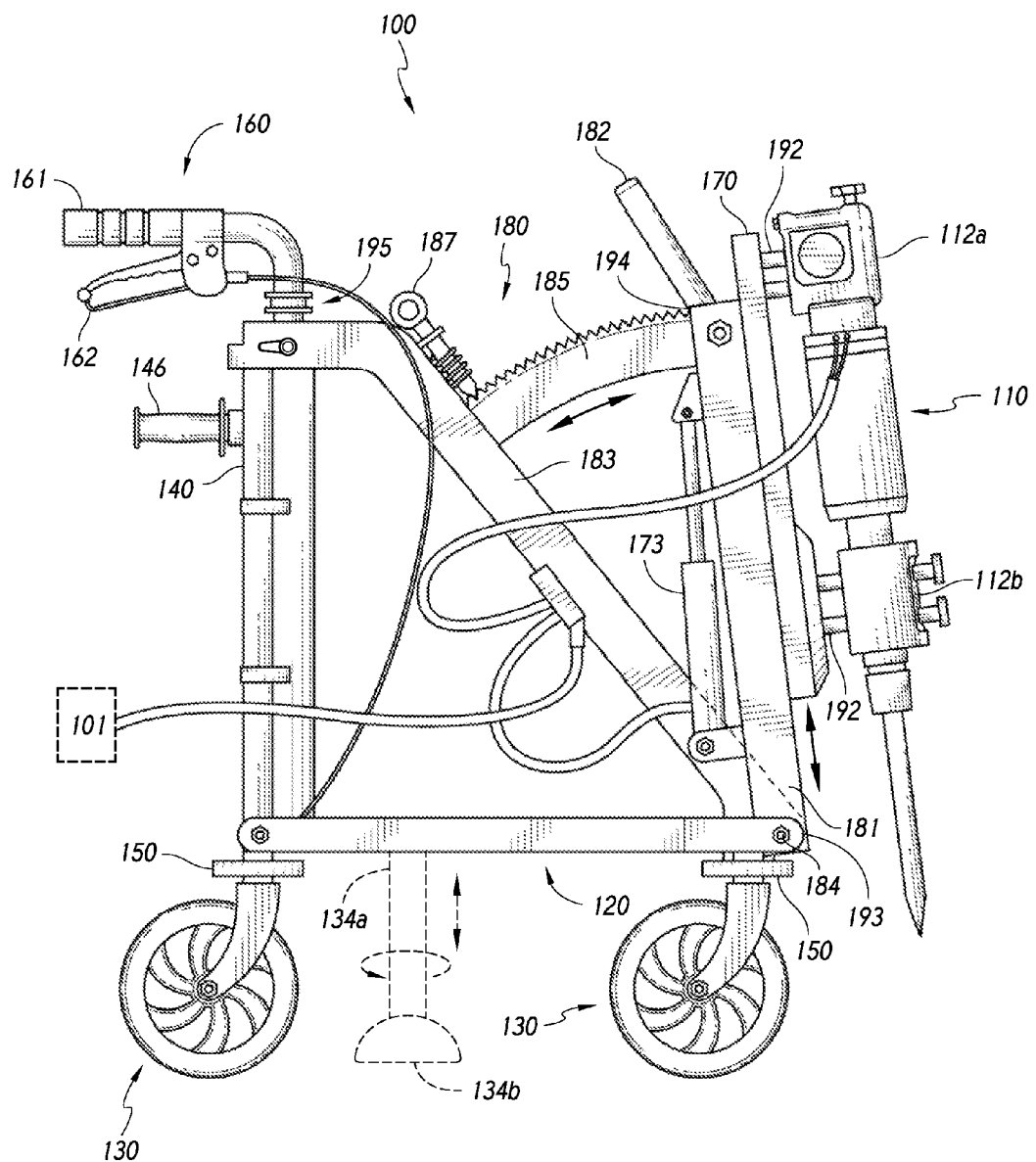
FIG. 1 is a side perspective view of an exemplary, preferred cart system with subsystems (e.g. a mechanical lifting subsystem), a standard pneumatic jackhammer tool being mounted on the cart system.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

As described in the Background, a first group of references disclose lift assist devices that provide mechanical means for lifting jackhammer tools off the ground. All of these references disclose devices that provide assistance to the operator in lifting jackhammer tools. These devices do not, however, relieve the operator from the burden of positioning and balancing the tool while in operation, do not relieve the operator of the burden of bearing all or much of the tool's weight during repositioning, and do not protect the operator from vibration, noise, or danger associated with the moving parts of the tools. In addition, all of these devices pose an additional risk to operators via the lifting elements that can push against feet and toes with forces exceeding 300 lbs. during lifting.

As also described in the Background, a second group of references disclose devices that assist in the positioning of jackhammer tools by providing wheeled carts that support all or some of the weight of these jackhammer tools while they are being transported or repositioned. The trolleys and carts disclosed for use with jackhammer tools all relieve the operator of some, or all, of the weight of the jackhammer when in use. To varying degrees, they also provide support for some, or all, of the weight of the jackhammer during repositioning and transport via wheels. Some provide assistance in lifting the jackhammer tool via either levers or springs. None provide mechanical lifting of the jackhammer tool via a powered lifting subsystem. Therefore, operators are still required to provide the strength for most of the lifting and repositioning of the jackhammer tool.

Described herein is a manipulation cart system (hereinafter referred to as a "cart system 100") that solves the problems of the known references. More specifically, disclosed herein is a wheeled cart system 100 having multiple subsystems (e.g. a lifting subsystem 170 for lifting tools and a tilting subsystem 180 for tilting tools) that at least partially relieve the operator from the physical demands of manipulating tools 110 (e.g. jackhammer tools). Preferably, the cart system 100 at least partially relieves the operator from the physical demands of manipulating tools 110. Preferably, the cart system 100 at least partially protects operators from vibration and stress-induced injuries associated with manipulating such tools 110.

Preferred cart systems 100 described herein preferably include a chassis subsystem 120 and a locomotion subsystem 130. The chassis subsystem 120 and a locomotion subsystem 130 support and/or provide a framework for additional subsystems described herein and at least one tool 110. Preferred cart systems 100 described herein further preferably include at least one manipulation subsystem (e.g. at least one lifting subsystem 170 and/or at least one tilting subsystem 180). Preferred cart systems 100 described herein still further preferably include a vibration reduction subsystem 190 for reducing vibration transmitted from the tool 110 to the operator.

Exemplary cart systems 100 may be better understood with reference to the drawings, but these exemplary cart systems 100 are not intended to be of a limiting nature. The same reference numbers will be used throughout the drawings and description in this document to refer to the same or like parts.

Definitions

Before describing the exemplary cart systems 100 and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The term "tools" is used to describe "heavy" tools that have repetitive motion. As used herein, lightweight tools (e.g. handheld electrical and mechanical tools such as a wrench and/or a handheld electric drill) that can easily be picked up and carried are not "tools" that would be used with this invention. Similarly, extremely heavy tools (e.g. weighing greater than 300 pounds) are not "tools" that would be used with this invention. Instead, the tools 110 that would be used with the cart system 100 described herein are the mid-range tools 110. Most of these tools 110 could be lifted (and possibly even used) by a user (or by two users), but the sustained lifting, tilting, manipulation, and/or use would be fatiguing or otherwise difficult. Exemplary tools 110, as used herein, are generally jackhammer tools as described in the Background, but could include other tools known or yet to be discovered that are heavy tools that have repetitive motion when in use.

The terms "manipulation," "manipulate," and/or "manipulating" (and variations thereof), when used in relation to how an operator interacts with a tool, are meant to broadly encompass different types of manipulation including, but not limited to, moving, positioning, and otherwise handling tools. The various subsystems described herein handle specific types of manipulation. For example, the locomotion subsystem 130 moves and positions the tool in any planar direction. Another example is the lifting subsystem 170 that moves and positions the tool "vertically." Another example is the tilting subsystem 180 that moves and positions the tool by tilting it forward/backward (shown), side/side, or over a range of motion. Different types of manipulation may also be provided by different subsystems. For example, the position holding subsystem 150 manipulates the tool by holding the tool in a single position. Another example is the control subsystem 160 (alone or in combination with other subsystems) that manipulates the tool by controlling it.

The systems and subsystems are described as being controlled by control mechanisms that may be associated with the control subsystem 160 (that may be associated with the gripping handles 161). The control mechanisms control the systems and subsystems using "signals," "communications," and/or "transmissions" (referred to jointly as "manipulation signals" that may be, for example, direct physical manipulation signals (e.g. using the tilt handle 182 to directly manipulate the tilting subsystem 180), indirect physical manipulation signals (e.g. using the brake levers 162 to indirectly manipulate the position holding subsystem 150 through wires), and indirect wireless manipulation signals (e.g. using control mechanisms that wirelessly transmit signals to manipulate the subsystems). Regardless of which manipulation signal is shown and described related to a particular system or subsystem, the manipulation signals are to be considered exemplary and alternatives may be used.

The term "associated" is defined to mean integral or original, retrofitted, attached, connected (including functionally connected), positioned near, and/or accessible by. For example, the tool 110, subsystems, or other components may be associated with the cart system 100 without being physically mounted on the cart system 100. Another example is that the locomotion subsystem 130 would be associated with the bottom of the chassis subsystem 120 even if it was attached to the lower portion of the chassis subsystem 120 and not the exact bottom.

It should be noted that relative terms (e.g. first and second) are meant to help in the understanding of the technology and are not meant to limit the scope of the invention.

It should be noted that some terms used in this specification are meant to be relative. For example, the term "front" is meant to be relative to the term "back," and the term "side" is meant to describe a "face" or "view" that connects the "front" and the "back." For purposes of description, the term "front" has been used consistently to mean the part of the system where the tool would be mounted and the term "back" has been used consistently to mean the part of the system where the operator would stand. Another example is that the term "bottom" (used herein in relation to the location of the locomotion subsystem 130) is meant to be relative to the term "top." Rotation of the system or component that would change the designation might change the terminology, but not the concept.

It should be further noted that although the cart system 100 is described as including various subsystems, the terms are not meant to be limiting. For example, some subsystems may overlap in that a particular component or element may serve dual functions and, therefore, be part of multiple subsystems. Further, subsystems may be combined or divided as needed and practical.

The terms "may," "might," "can," and "could" are used to indicate alternatives and optional features and should only be construed as a limitation if specifically included in the claims. It should be noted that the various systems, subsystems, mechanisms, components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representative, and/or illustration of a type. The term "exemplary" does not necessarily mean the best or most desired of the type. For example, an "exemplary lift strut 173" being a "cylinder and a piston rod" is just one example of a lift strut, but other lift struts could be just as desirable.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, contains, or comprises A and B, but optionally may contain C or additional components other than A and B). It should be noted that, unless otherwise specified, the singular forms "a," "an," and "the" refer to one or more than one, unless the context clearly dictates otherwise.

Chassis Subsystem and Attachment Subsystem

Figure 2:
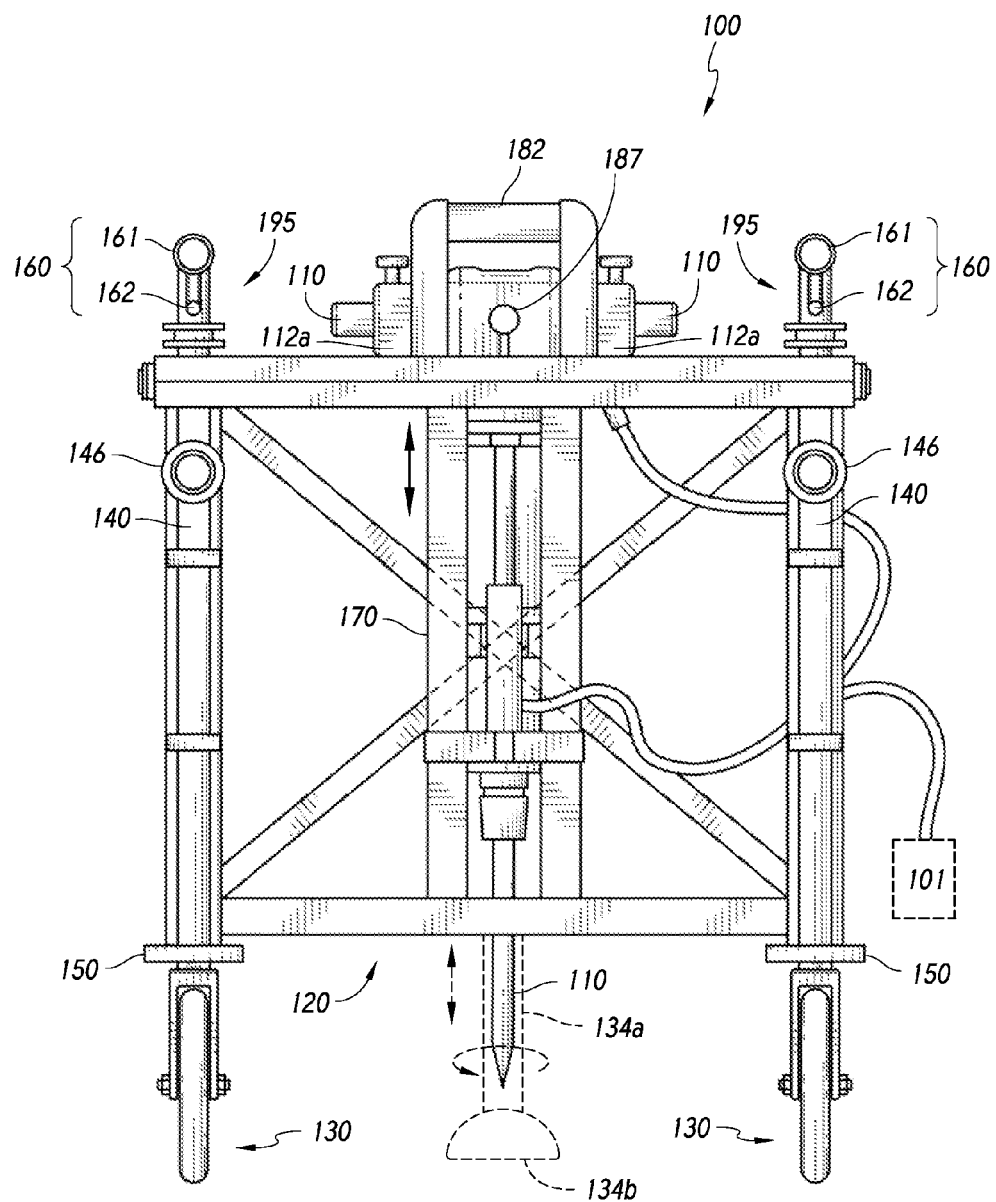
FIG. 2 is a back perspective view of the exemplary, preferred cart system with a standard pneumatic jackhammer tool as shown in FIG. 1.

As shown in FIGS. 1 and 2, the chassis subsystem 120 supports and/or provides a framework for additional subsystems described herein and at least one tool 110. The attachment subsystem (shown as 112a and 112b, but discussed generally as 112) directly or indirectly attaches at least one tool 110 to the chassis subsystem 120. Direct attachment would be directly to the chassis subsystem 120. Indirect attachment would be to the chassis subsystem 120 via at least one separate subsystem (e.g. the lifting subsystem 170 or the tilting subsystem 180).

The chassis subsystem 120 provides the structure to support all elements and subsystems of the cart system 100, the attached tool 110, and any optional elements as described below. The chassis subsystem 120 preferably supports a plurality of subsystems described herein including, but not limited to, the locomotion subsystem 130, the positioning control subsystem 140, the position holding subsystem 150, the control subsystem 160, the lifting subsystem 170, the tilting subsystem 180, the vibration reduction subsystem 190, and/or any optional or alternative subsystems. Not all the subsystems must be supported by the chassis subsystem 120. Also, depending on the intended use, some of the subsystems may not be necessary.

The shown chassis subsystem 120 is meant to be exemplary and not to limit the scope of the invention unless specifically so limited in the claims. For example, the chassis subsystem 120 may have various alternative configurations to suit particular applications. Although the shown chassis subsystem 120 is made of square and rectangular welded steel (e.g. steel bars and/or steel tubing), depending on the application, the chassis subsystem 120 may be made in alternative shapes/configurations and/or of alternative materials including, but not limited to, aluminum or other metals, plastics, composites, sturdy materials known or yet to be discovered, or any combination of suitable materials. The chassis subsystem 120 may also vary in size or proportions to suit particular tools 110 and/or applications. For example, the chassis subsystem 120 may be sized to accommodate tools 110 of different sizes or types. The chassis subsystem 120 may have structure or subsystems directed to accommodating specific needs including transport requirements, storage requirements, and site limitations (e.g. terrain, space limitations, access limitations such as doorways or staircases). For example, the chassis subsystem 120 may include structure permitting disassembly or reconfiguration (e.g. folding elements) for transport or storage requirements.

Figure 3:
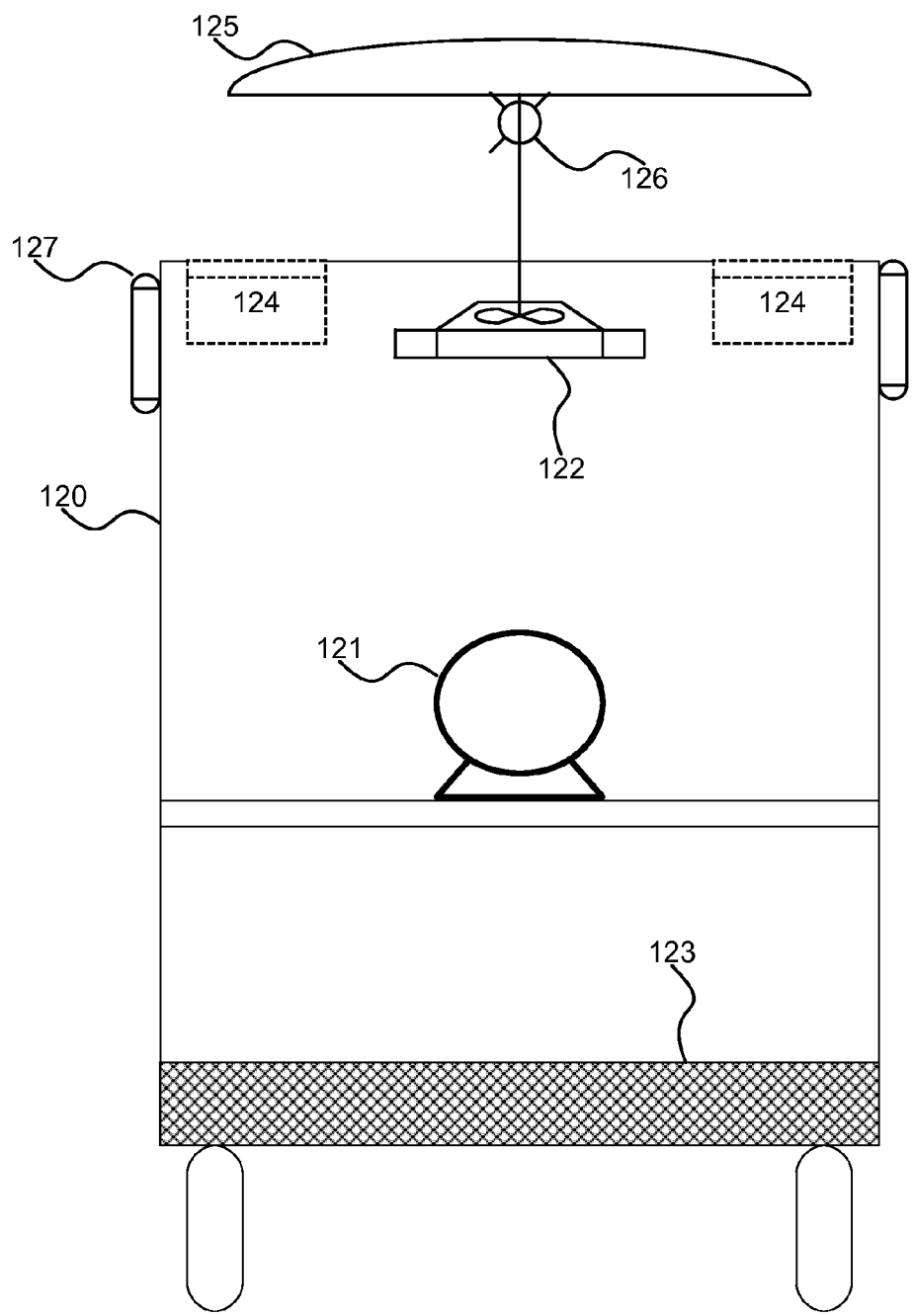
FIG. 3 is a graphical representation of an exemplary arrangement of possible subsystems that might be incorporated in a cart system, the arrangement of the subsystems and the particular shown references is meant to be exemplary and not to limit the scope of the invention.

In addition to the subsystems specifically described herein, the chassis subsystem 120 may also support optional subsystems (shown generally in FIG. 3) including, but not limited to:

A power subsystem 121 such as an engine or a battery to provide power for the cart system 100, its subsystems, and the attached tool 110, eliminating the need for an external power source 101 (although some systems will use both power source 101 and power source 121 which may be the same type of power source or different types of power sources);

Dust-control subsystems 122 (e.g. fans or vacuums);

Protection subsystems 123 such as debris shields (e.g. physical barriers to protect the operator and/or the cart system 100 or subsystems therefor);

Noise-control subsystems (not shown) including, for example, exhaust mufflers for pneumatic tools;

Storage subsystems 124 such as pockets, suspenders (e.g. hooks or pegs), straps, or other storage means for storing lightweight handheld tools (e.g. wrenches, screwdrivers, and hammers), personal items (e.g. drinking water and communications equipment), and other necessities (e.g. spare parts);

Heat reduction subsystems 125 such as umbrellas, fans, or other means for protecting the operator and/or the cart system 100 or subsystems thereof from ambient heat;

Lighting subsystems 126; and/or

Gripping subsystems 127 such as lift handles or lift points.

Closely associated with the chassis subsystem 120 is at least one attachment subsystem 112. Although not specifically shown, various attachment subsystems may be used for securing other subsystems to each other and/or to the chassis subsystem 120.

The shown attachment subsystem 112 is used for securely attaching the tool 110 directly or indirectly to the chassis subsystem 120. The attachment subsystem 112 may be a universal quick mount subsystem that will permit operators to rapidly mount or dismount the tool 110 from the lifting subsystem 170 (and/or the tilting subsystem 180) which is, itself, attached to the chassis subsystem 120. The attachment subsystem 112 also provides secure attachment during operation of the tool 110. The attachment subsystem 112 may also include components of a vibration reduction subsystem 190 that provide vibration isolation between the tool 110 and the lifting subsystem 170. Although specialized attachment subsystems may be used to accommodate specific tools, some preferred attachment subsystems will be "universal," "adaptable," or otherwise designed to accommodate different types, brands, and sizes of tools. Alternatively, some cart systems 100 may include a kit of multiple attachment subsystems. Yet another alternative is to provide mounting mechanisms having a first section that is specially designed to mount with the tool 110 and a second section that is designed to mount with the cart system 100. This type of mounting mechanism would, most likely, remain attached to the tool 110 when the tool 110 was not being used with the cart system 100. Still another alternative is to use traditional attachment mechanisms (e.g. bolts, straps, and other known fasteners) to attach the tool 110 to the cart system 100.

Figure 4:
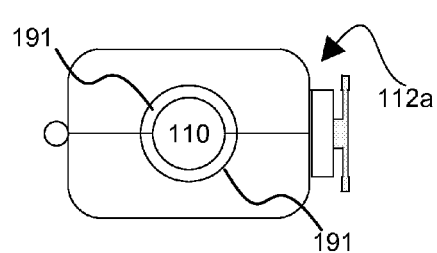
FIG. 4 is a cross-sectional view showing a support cradle in which the handles of the tool may be secured when the tool is mounted in the cart system.
Figure 5:
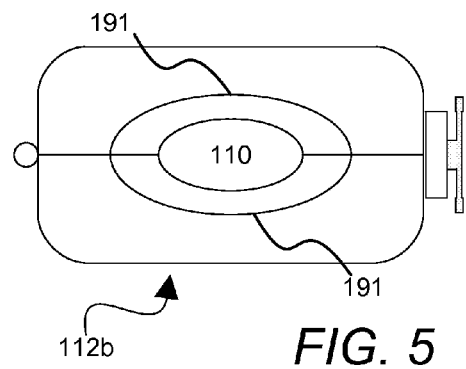
FIG. 5 is a cross-sectional view showing a rounded mount in which the body of the tool may be secured when the tool is mounted in the cart system.

The shown exemplary, preferred attachment subsystem 112 is a quick mount subsystem that includes dual support cradles 112a (FIG. 1, FIG. 2, and FIG. 4) in which the handles of the tool 110 may be secured when the tool 110 is mounted and a rounded mount 112b (FIG. 5) in which the body of the tool 110 is secured when the tool 110 is mounted. The shown dual support cradles 112a include hinged brackets that, when closed, enclose the handles of the tool 110 so that they are held substantially parallel to the working surface. The shown rounded mount 112b includes hinged brackets that, when closed, enclose the body of the tool 110 in a position substantially perpendicular to the working surface. As shown in FIGS. 4 and 5, the exemplary dual support cradles 112a and the rounded mount 112b are clamshell-like having a back section hinged on one side to a front section (e.g. the hinged bracket) and secured on the other side using a securing mechanism (e.g. a latch) to secure (e.g. "lock") the two sections together. Put another way, the hinged brackets of both the dual support cradles 112a and the rounded mount 112b are held closed by securing mechanisms (e.g. toggle-latches, wing-nuts, thumbscrews, bolts, spring-loaded latches, or other means for securing the bracket over the handles of the tool 110). Preferred securing mechanisms are openable and closeable by hand, without the use of special tools. The securing mechanisms may also be considered to be part of the attachment subsystem 112. The tool 110 is secured within the attachment subsystem 112. As shown, the attachment subsystem 112 may be lined with neoprene, rubber, or other vibration isolating materials at the interface with the tool 110 to securely hold the tool 110 and absorb vibration.

The shown chassis subsystem 120 and attachment subsystem 112 are exemplary preferred subsystems and, features thereof should not be considered to be limiting if claimed.

Locomotion Subsystem

The locomotion subsystem 130 supports the weight of the cart system 100, the attached tool 110, and any subsystem positioned on or within the cart system 100. The locomotion subsystem 130 also provides stabilization. The locomotion subsystem 130 is shown as being generally associated with the bottom of the chassis subsystem 120.

In the shown preferred exemplary cart system 100, the locomotion subsystem 130 consists of a plurality of wheels (at least three wheels, but more wheels are possible) associated with the bottom of the chassis subsystem 120. The wheels are shown as being associated with optional casters (wheels or rotating balls mounted in a swivel frame and used for support and movement). As shown, the casters can rotate in a circle parallel to the bottom of the chassis subsystem 120 and the wheels (which could be balls) in a circle perpendicular to the bottom of the chassis subsystem 120. The shown front casters (nearest the tool 110) may caster freely. (Alternatively, the front casters may have a positioning control subsystem 140 and/or a position holding subsystem 150 similar to those associated with the back casters.) The back casters may, under the operator's control (using, for example, the wheel positioning control handle 146 and the wheel positioning ring 147), caster freely or lock into either the "front to back" (forward/backward) or "side to side" (side/side) positions using the positioning control subsystem 140. Use of the position holding subsystem 150, under the operator's control (using the brake levers 162 or other controls that may be associated with the gripping handles 161 or the control subsystem 160), allows the wheels and/or casters to turn freely or, when activated, applies friction or other stopping mechanisms to both the wheels and casters to retard or stop completely the turning of both wheels and casters.

The locomotion subsystem 130 may include wheels, balls, or other locomotion devices of any type or size suited to the conditions of use including, but not limited to, pneumatic tires, solid rubber tires, synthetic material tires, steel tires, or sizes and types of wheels known or yet to be discovered. In addition to or in place of the wheel locomotion subsystem 130, the cart system 100 may include alternative forms of locomotion such as caterpillar tracks, hover mechanisms, walking mechanisms, or other means of locomotion known or yet to be discovered. Some of the additional or replacement alternative locomotion subsystems may be particularly suited for locomotion over stairs or other obstacles, for example using skids, belts, or stair-climbing subsystems.

The locomotion subsystem 130 may include an optional turn pivot that includes a turn pivot shaft 134a and a turn pivot grip 134b (jointly referred to as turn pivot 134). The turn pivot 134 is preferably associated with the lower portion of the chassis subsystem 120. Although not shown, there may be one or more cross-members that span the distance between the sides of the chassis subsystem 120 or that span the distance between the front and back of the chassis subsystem 120 and the turn pivot 134 may be associated with one or more of these cross-members. The turn pivot 134 is raisable and lowerable in relation to the bottom of chassis subsystem 120. Raising and lowering may be accomplished by any means known or yet to be discovered including, but not limited to, raising/lowering vertically as a unit, hinging as a unit (e.g. like a bicycle kickstand), or the turn pivot shaft 134a being a telescoping unit. The turn pivot grip 134b is preferably made of a material or construction such that it grips the ground. For example, the turn pivot grip 134b may be a rubber stopper or a suction cup. Alternatively, the turn pivot grip 134b may be a wheel or a point. Preferably, there is a bearing or rotating mechanism that allows rotation between the turn pivot shaft 134a and the turn pivot grip 134b. If the turn pivot grip 134b is a wheel or a point, the bearing or rotating mechanism may not be necessary. Preferably, an operator may actuate (raise/lower) the turn pivot 134 such that when the turn pivot 134 is lowered it engages the surface upon which the locomotion subsystem 130 rests and when the turn pivot 134 is raised it does not engage (e.g. is remote from and/or above) the surface upon which the locomotion subsystem 130 rests. An operator may actuate raise/lower the turn pivot 134 using control mechanisms that may be part of the control subsystem 160. The turn pivot 134 is generally raised during normal locomotion. The turn pivot 134 may be lowered when pivoting is desired (e.g. during the process described in relation to FIGS. 17-19, or to implement a sharp turn during locomotion). Raising and lowering may be accomplished using control mechanisms that may be associated with the control subsystem 160. The turn pivot 134 may be locked into either the raised position or the lowered position. The pivot shaft 134a is preferably long enough so that, when the turn pivot 134 is lowered, the turn pivot 134 exerts sufficient force upon the working surface such that the cart system is easily pivoted about the turn pivot 134 and the tool 110 may be swung in an arc parallel to the working surface. As shown, the turn pivot 134 is positioned towards the back third of the chassis subsystem 120. Although the shown position is exemplary (and could be changed), the further back the turn pivot 134 is positioned, the larger the possible arc. The turn pivot 134 and associated control mechanisms may be considered a "pivoting subsystem."

Although shown as a simple mechanical locomotion subsystem 130, the locomotion subsystem 130 (or the alternative locomotion subsystems described above) may be powered (e.g. motorized) and/or controlled (e.g. computerized).

The shown locomotion subsystem 130 is an exemplary preferred subsystem and, features thereof should not be considered to be limiting if claimed.

Positioning Control Subsystem and Position Holding Subsystem

Related to the locomotion subsystem 130 are the positioning control subsystem 140 and the position holding subsystem 150. The positioning control subsystem 140 includes mechanisms for positioning the cart system 100. The position holding subsystem 150 includes mechanisms for holding the cart system 100 in position. The wheel positioning handle 146 at least in part allows the operator to control the positioning control subsystem 140. The position holding subsystem 150 is shown as being controlled by mechanisms associated with the wheel positioning handle 146 that, at least in part, permits control by the operator.

The positioning control subsystem 140 is preferably designed to selectively position the locomotion subsystem 130 into at least three configurations including a free configuration, a first directional configuration, and a second directional configuration. For example, the positioning control subsystem 140 may consist of elements that, at the operator's control, permit free caster of the rear wheels (a free configuration), lock the casters of the rear wheels into the "front to back" (forward/backward) position (a first directional configuration), or lock the casters of the rear wheels into the "side to side" (side/side) position (a second directional configuration). The directional configurations are meant to be exemplary and could be adapted for specific implementations. Further, additional directional configurations could be added. When rear wheels are permitted to freely caster, the operator can move the cart system 100 in virtually any direction. When rear wheels are locked in the forward/backward position, the operator can move the cart system 100 only forward and/or backward or turn the cart system 100 in a manner similar to an American-style shopping cart. When rear wheels are locked in the side/side position, the operator can move the cart system 100 only side to side. The side/side position may be used to traverse the cart system 100 across the slope of a hill (e.g. in a sloped driveway) while preventing the cart system 100 from rolling down the hill.

Figure 6:
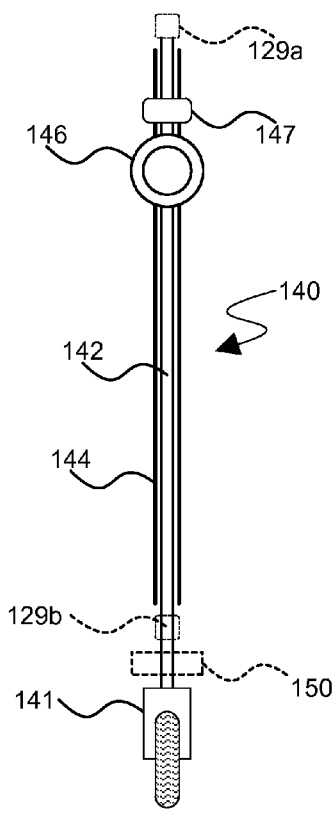
FIG. 6 is a cross-sectional side view showing an exemplary positioning control subsystem.
Figure 7:
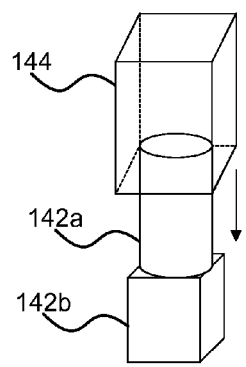
FIG. 7 is a perspective view of an exemplary inner shaft with a bottom portion having square cross-section and an exemplary outer shaft with at least a bottom portion having a square cross-section, the bottom portion of the outer shaft positioned above the bottom portion of the inner shaft so that there can be rotation between the inner and outer shafts.
Figure 8:
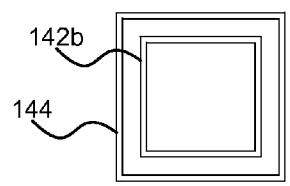
FIG. 8 is a cross-sectional view showing the portion of the exemplary inner shaft having a square cross-section within the portion of the exemplary outer shaft having a square cross-section, the rotational movement therebetween being limited.

As shown, there are two exemplary positioning control subsystems 140, each associated with and described as including a rear castor/wheel set. As shown in FIG. 6, each shown exemplary positioning control subsystem 140 may include a rear caster (shown in FIG. 6 as caster 141) that is attached to a vertical shaft (shown in FIG. 6 as inner shaft 142) that is, in turn, attached to the chassis subsystem 120 via bearings 129*a*, 129*b* at the upper and lower portions of the inner shaft 142. The caster 141 and inner shaft 142 are fixed to one another so that they turn as a unit. Each inner shaft 142 is positioned within another hollow outer shaft (shown in FIG. 6 as outer shaft 144) that can generally rotate independently of the inner shaft 142. The outer shaft 144 is preferably dimensioned such that it is not as long as the length between the bearings 129*a*, 129*b*. This allows the outer shaft 144 to slide vertically up and down on the inner shaft 142 between the bearings 129*a*, 129*b*. As shown in FIG. 7, the inner shaft 142 preferably has a generally circular cross-section (the outer periphery being circular) along most of its length 142*a*, but the bottom portion (e.g. approximately 1 inch to 2 inches) of the inner shaft 142*b* preferably has an outer periphery with an alternative cross-sectional shape (e.g. square, hexagonal, or splined). At least at the bottom portion (e.g. approximately 1 inch to 2 inches) of the outer shaft 144 preferably has an inner profile (the inner periphery of the hollow outer shaft 144) with an alternative cross-sectional shape (e.g. square, hexagonal, or splined) to match the outer profile of the bottom portion of the inner shaft 142*b*. (The entire length of the outer shaft 144 may have the alternative cross-sectional shaped inner profile or just the bottom portion of the outer shaft 144 may have the alternative cross-sectional shaped inner profile.) FIG. 7 shows the bottom portion of the outer shaft 144 positioned above the bottom portion 142*b* of the inner shaft 142 so that there can be rotation between the inner and outer shafts. FIG. 8 shows the square portion 142*b* of the exemplary inner shaft 142 within the square portion of the exemplary outer shaft 144. When the outer shaft 144 is slid down to the bottom of its range of vertical movement, the inner profile of the outer shaft 144 engages the external profile of the inner shaft 142 so that the rotation of the inner shaft 142 can be controlled by the rotation of the outer shaft 144. Attached at a right angle to the outer shaft 144 near its upper end is a wheel positioning handle 146. The wheel positioning handle 146 controls the rotation of the outer shaft 144 at all times. The wheel positioning handle 146 controls the rotation of both the outer shaft 144 and the inner shaft 142 when the inner and outer shafts 142, 144 are engaged. Put another way, the wheel positioning handle 146 can be used to lower or raise the outer shaft 144 relative to the inner shaft 142. In the raised position, the wheel positioning handle 146 can be positioned to rest in a cradle (not shown) toward the center of the chassis subsystem 120. When the wheel positioning handle 146 is resting in the cradle, the wheel positioning handle 146 holds the outer shaft 144 in the raised position and leaves the caster 141 and inner shaft 142 to rotate freely.

Figure 9:
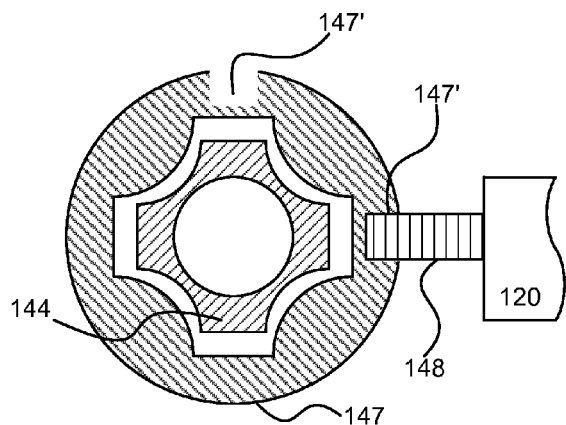
FIG. 9 is a cross-sectional view of an exemplary ring and an exemplary outer shaft, at least one notch on the outer surface of the ring engaging with a spur associated with the chassis subsystem to lock the casters/wheels in a first position.
Figure 10:
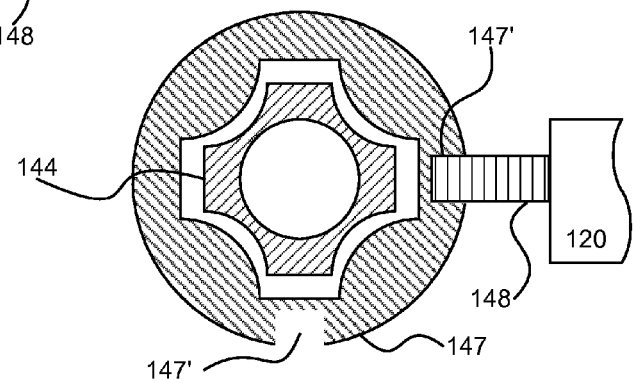
FIG. 10 is a cross-sectional view of the exemplary ring and the exemplary outer shaft, at least one different notch on the outer surface of the ring engaging with the spur associated with the chassis subsystem to lock the casters/wheels in a second position.

As shown in FIG. 6, above the wheel positioning handle 146 on the outer shaft 144 is a wheel positioning ring 147 that wraps around the outer shaft 144. Preferably the wheel positioning ring 147 can be raised and lowered relative to the outer shaft 144 via a control lever (not shown, although the lever may be associated with the wheel positioning control handle 146). As shown in FIGS. 9 and 10, the wheel positioning ring 147 may be splined on its inner surface to mate to matching splines on the outer surface of the outer shaft 144. The outer surface of the wheel positioning ring 147 may include a plurality of notches 147' (e.g. two) that engage a spur 148 on the chassis subsystem 120 when the wheel positioning ring 147 is lowered. When the wheel positioning ring 147 is raised, the wheel positioning ring 147 sits above the spur 148 and turns freely relative to the spur 148. The notches 147' are arranged so that when engaged on the spur 148 (by lowering the wheel positioning ring 147), they hold the outer shaft 144 (and when engaged on the inner shaft 142, the inner shaft 142 as well) in position such that the casters 141 are held in either the forward/backward position or side/side position. For example, when the spur 148 engages a first notch 147' as shown in FIG. 9, the casters 141 are held in the forward/backward position. If wheel positioning ring 147 is rotated a quarter of a turn, the spur 148 engages a second notch 147' as shown in FIG. 10, the casters 141 are held in the side/side position.

The position holding subsystem 150 may be thought of as a braking system that may include braking mechanisms associated with the castors/wheels braking control mechanisms associated with the control subsystem 160. The shown position holding subsystem 150 includes sturdy braking rings above and around the wheels. When the position holding subsystem 150 is activated by the operator using a hand brake lever 162, the braking rings are depressed until they contact the wheels. The amount of force applied to the hand brake lever 162 can be varied by the operator to provide progressive retardation of the wheel rotation and castering. When sufficient force is applied to the hand brake lever 162, all motion of the casters and/or wheels is prevented thereby holding the cart system 100 in position relative to the working surface. The hand brake lever 162 may include a controllable ratcheting mechanism that can be engaged to hold the hand brake lever 162 in position and thereby lock the position holding subsystem 150 in a partially or fully locked position.

The positioning control subsystem 140 and the position holding subsystem 150 may incorporate known structure (e.g. castering and/or braking systems) of references including, but limited to, those discussed in the Background, those discussed, elsewhere in this document, and those shown and described in U.S. Pat. No. 3,493,085 to Libhart, U.S. Pat. No. 3,828,392 to Bolger, U.S. Pat. No. 4,385,414 to Damico, U.S. Pat. No. 4,985,960 to Zun, U.S. Pat. No. 5,377,372 to Rudolf et al., U.S. Pat. No. 5,745,951 to Waner, U.S. Pat. No. 6,296,261 to deGoma, U.S. Pat. No. 6,321,878 to Mobley et al., U.S. Pat. No. 6,865,775 to Ganance, and U.S. Pat. No. 7,810,822 to Figel et al. The shown positioning control subsystem 140 and position holding subsystem 150 are exemplary preferred subsystems and, features thereof should not be considered to be limiting if claimed.

Lifting Subsystem

The lifting subsystem 170 of the cart system 100 enables an operator to relatively "vertically" position the tool 110 for transport or operation. The term, "vertically," is meant to be general in that, when used with the tilting subsystem(s) 180, the "vertical lifting" would be at an angle defined by the tilting subsystem(s) 180. Preferably the lifting subsystem 170 is a powered lifting subsystem 170. (The power may come from a remote power source 101 and/or an onboard power source 121.) The lifting subsystem 170 (and particularly a powered lifting subsystem 170) relieves the operator from the burden of lifting, positioning, and extracting the tool 110.

Figure 11:
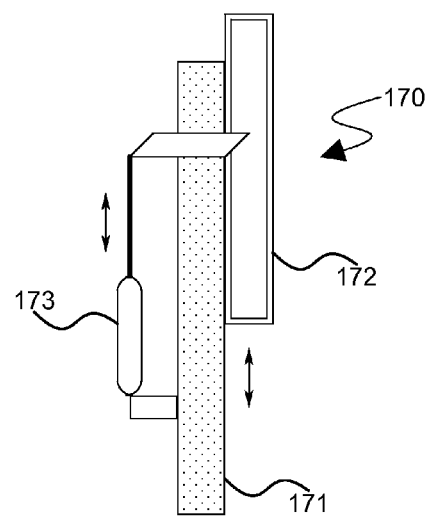
FIG. 11 is a side view of a simplistic exemplary lifting subsystem including at least one lift support frame, a lift telescoping element, and at least one lift strut, the lifting subsystem being in an at least partially raised (lifted) configuration.
Figure 12:
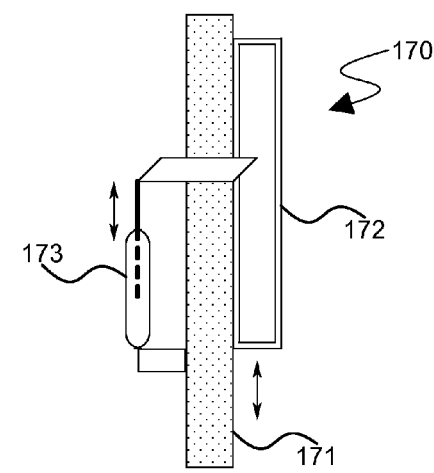
FIG. 12 is a side view of the simplistic exemplary lifting subsystem of FIG. 11, the lifting subsystem being in an at least partially lowered configuration as compared to the configuration of FIG. 11.

As shown in FIGS. 11 and 12, a simplistic exemplary lifting subsystem 170 may include a lift support frame 171, a lift telescoping element 172, and at least one lift strut 173. The lift support frame 171 may be made of a suitable sturdy material (e.g. metal). The lift support frame 171 may be securely attached to the chassis subsystem 120 (and/or tilt support frame 181), may be integrated with the chassis subsystem 120 (and/or tilt support frame 181), or may be otherwise associated with the chassis subsystem 120 (and/or tilt support frame 181). For example, the tilt support frame 181 may function as the lift support frame 171. The lift telescoping element 172 may be directly or indirectly attached to the lift support frame 171 using interlocking channels, a track and bogey subsystem, or other suitable sliding mechanisms suitable to perform the telescoping/lifting function. The lift telescoping element 172 may itself be telescoping or may telescope in relation to the lift support frame 171. If the tilt support frame 181 is functioning as the lift support frame 171, the lift telescoping element 172 may telescope in relation to the tilt support frame 181. The tool 110 may be secured directly or indirectly to the lift telescoping element 172 using, for example, the attachment subsystem 112. The lift strut(s) 173 may be, for example, at least one lift support, at least one gas spring (gas damper), at least one single-acting pneumatic cylinder, or any device (s) suitable for lifting and lowering the telescoping element 172 and the tool 110. One exemplary lift strut 173 has a cylinder and a piston rod. The piston rod moves in (contracts) and moves out (expands) of the cylinder. The base of the cylinder of the lift strut 173 is attached (directly or indirectly) to the lift support frame 171. The free end (the end not associated with the cylinder, shown at the top, but the positioning could be reversed) of the piston rod of the lift strut 173 is attached to the lift telescoping element 172. When the lift strut 173 expands, the lift telescoping element 172 raises in relation to the lift support frame 171 and, thus the attached tool 110 lifts. When the lift strut 173 contracts, the lift telescoping element 172 lowers in relation to the lift support frame 171 and, thus the attached tool 110 is brought down.

The lifting subsystem 170 may be either manual or powered depending on the application. If the lifting subsystem 170 is a powered lifting subsystem 170, depending on the intended application, 173 may be at least one pneumatic strut, at least one hydraulic strut, at least one electric strut, or any other strut(s) known or yet to be discovered. The power can be from any suitable source including pneumatic, hydraulic, electrical, or power sources 101, 121 known or yet to be discovered. In most preferred exemplary cart systems 100, the power source 101, 121 of the strut will be matched to the power source 101, 121 used to power the tool 110. In the shown exemplary cart system 100, pneumatic power is used.

The lifting and lowering of the lifting subsystem 170 is preferably under the control of the operator using a lifting subsystem actuator 164 built in to the control subsystem 160. When not activated, the lift strut 173 may permit the lift telescoping element 172 and attached tool 110 to descend by gravity until the tool 110 comes to rest on the working surface. The shown lifting subsystem 170 may use a lifting power source (e.g. the power source 101, 121 used for other subsystems could also be used for the lifting power source). The lifting subsystem 170 may also include automation in the sense that there may be programming to adjust the height of the lifting subsystem 170 under certain circumstances. For example, the lifting subsystem 170 may have a predetermined operator preferred height programmed, so that if the cart system 100 is on an unlevel or slanted ground surface (sensed by a leveling sensor, not shown), the lifting subsystem 170 could adjust the height of the tool 110 to accommodate for the unlevel or slanted ground surface. Another example is that the lifting subsystem 170 may be programmed to automatically lift the tool 110 for travel (as opposed to use).

The lifting subsystem 170, as mentioned, is an exemplary preferred subsystem and, features thereof should not be considered to be limiting if claimed. Alternative lifting subsystems 170 are shown and described in references discussed herein including, but not limited to, U.S. Pat. No. 4,558,648 to Franklin et al., U.S. Pat. No. 5,484,151 to Tholkes, U.S. Pat. No. 5,649,422 to Baginski et al., U.S. Pat. No. 7,044,423 to Bober et al., U.S. Pat. No. 7,607,491 to Sorric et al., U.S. Pat. No. 7,632,058 to Ablabutyan et al., and U.S. Pat. No. 8,910,326 to Wilson.

Tilting Subsystem

The lifting subsystem 170 may be used in combination with at least one tilting subsystem 180 that permits the operator to control the tilt of the lifting subsystem 170 and the tool 110. The tilting subsystem 180 allows the operator to optimize the position of the tool 110 relative to the working surface (e.g. ground).

The shown tilting subsystem 180 is a front-to-back tilting subsystem that facilitates forward tilt of the tool 110 (away from the front of the cart system 100) and backward tilt (towards the front of the cart system 100 where the gripping handles 161 are positioned). For some preferred exemplary cart systems 100, a side-to-side tilting subsystem (not shown) may be used to facilitate side-to-side tilting. Both a front-to-back tilting subsystem and a side-to-side tilting subsystem may be incorporated in a cart system 100. Further, a single subsystem may be used to facilitate both front-to-back tilting and side-to-side tilting. Still further, an omni-directional tilting subsystem 180' (such as the system shown in FIG. 14) could be used that uses structure (such as a ball joint) that allows tilting in almost any direction.

Figure 13:
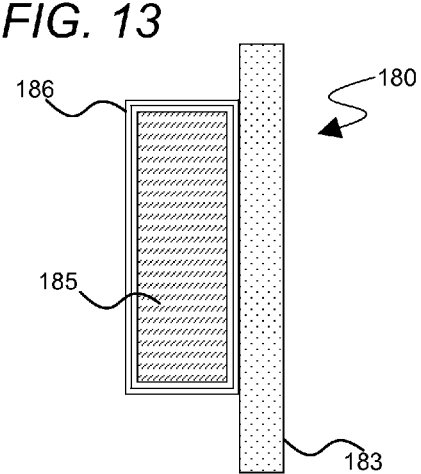
FIG. 13 is an end or cross-sectional view of part of the tilting subsystem including the tilt brace, the tilt guide, and the tilt bracket through which the tilt guide advances and retreats.

As shown in FIGS. 1, 2, and 13, the tilting subsystem 180 includes a tilt support frame 181 that may have an associated tilt handle 182, a tilt brace 183, a tilt pivot 184, a tilt guide 185, a tilt bracket 186, and a tilt lock 187. The tilt support frame 181 may be securely attached to the chassis subsystem 120 (and/or lift support frame 171), may be integrated with the chassis subsystem 120 (and/or lift support frame 171), or may be otherwise associated with the chassis subsystem 120 (and/or lift support frame 171). The tilt handle 182 (which would provide a gripping location if the tilting subsystem 180 was manual) is shown at a first end of the tilt support frame 181 and the tilt pivot 184 is shown at the opposite second end of the tilt support frame 181. The tilt pivot 184 is shown as pivotably connecting the tilt support frame 181 to the tilt brace 183 and/or the chassis subsystem 120. The tilt brace 183 may be part of and/or otherwise associated with the chassis subsystem 120. The tilt pivot 184 is shown toward the lower end of the tilt brace 183 and the back end of the tilt guide 185 is shown relatively near the top end of the tilt brace 183. The tilt guide 185 is shown as an arced or curved bar of metal (or other suitable material) that is attached at its forward end to the tilt support frame 181 (towards the top thereof) and at its back end to the tilt brace 183 (towards the top thereof). In use, the tilt support frame 181 "scissors" in relation to the tilt brace 183 in that they pivot at one end (the lower end) about the tilt pivot 184 and open and close at the other end (the top end) as they are guided by the tilt guide 185.

The shown tilt guide 185 is an arced or curved bar that is shown as curved to match the arc created by the tilting of the tilt support frame 181 relative to the tilt brace 183 and/or the chassis subsystem 120. As shown in FIG. 13, the tilt guide 185 is attached to the chassis subsystem 120 via a tilt bracket 186 through which the tilt guide 185 slides in a curvilinear fashion. (Although shown as a rectangular structure, the tilt bracket 186 may be any device or combination of devices that both secures the tilt guide 185 in relation to the tilt brace 183 and allows movement (e.g. sliding) of the tilt guide 185 in relation to the tilt brace 183.) The tilt guide 185 may have teeth or notches (e.g. serrated) to engage with a tilt lock mechanism 187 that will hold the tilting subsystem 180 in position when the tilt lock mechanism 187 is engaged. The tilt lock mechanism 187 may include a spring-loaded latch attached to the tilt bracket 186 that engages the teeth or notches of the tilt guide 185 except when the tilt lock mechanism 187 is disengaged by the operator to permit tilting of the lifting subsystem 170. (The tilt lock mechanism 187 and other structure permitting locking of the tilting subsystem 180 may be replaced with one or more devices that permit the tilting subsystem 180 to be locked into place.)

Figure 14:
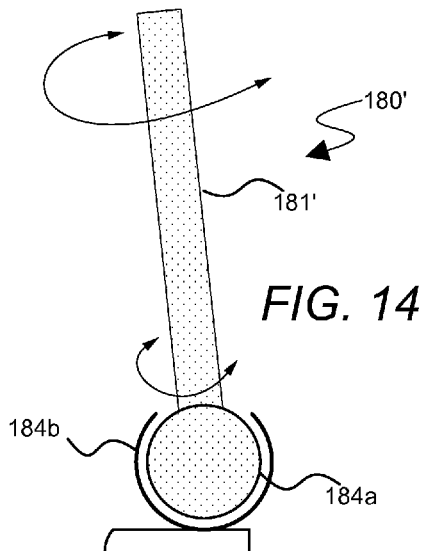
FIG. 14 is a cross-sectional view of part of an exemplary alternative omni-directional tilting subsystem that includes a ball joint.

FIG. 14 shows an exemplary alternative omni-directional tilting subsystem 180' that could replace the tilting subsystem 180. The omni-directional tilting subsystem 180' may include a ball joint (shown as a ball 184a and socket 184b) associated with the support frame 181'. The ball joint 184a, 184b allows tilting in almost any direction. The ball joint 184a, 184b would replace the tilt pivot 184. The omni-directional tilting subsystem 180', in addition to the tilt support frame 181' and ball joint 184a, 184b, might include guiding structure (similar in function to the tilt guide 185 and/or tilt bracket 186) and locking structure (similar in function to the tilt lock 187). The guiding structure (not shown) might constrain the range of the omni-directional tilting subsystem 180' to a desired range of positions. The locking structure (not shown) would allow the omni-directional tilting subsystem 180' to be held in a desired position once the position is attained.

The tilting subsystem 180 (and the omni-directional tilting subsystem 180' which is included in the reference to the tilting subsystem 180 unless specifically limited either by an explicit statement or by context) is shown as a manual tilting subsystem, but could be adapted to be powered and/or automated. For example, a tilting power source could be added (e.g. the power source 101, 121 used for other subsystems could also be used for the tilting power source). The tilting subsystem 180 may include struts similar to the lift strut 173. In still other preferred exemplary cart systems 100, similar tilting mechanisms (powered or manual) may be used to control side-to-side tilt of the lifting subsystem 170 and attached tool 110. The tilting subsystem 180 may also include automation in the sense that there may be programming to adjust the tilt of the tilting subsystem 180 under certain circumstances. For example, the tilting subsystem 180 may have a predetermined operator preferred angle programmed, so that if the cart system 100 is on an unlevel or slanted ground surface (sensed by a leveling sensor, not shown), the tilting subsystem 180 could adjust the tilt angle to accommodate for the unlevel or slanted ground surface. The tilting subsystem 180 may also include automation in the sense that there may be programming to adjust the tilt of the tilting subsystem 180 to the preference of a particular operator or to the preferences of multiple operators.

Control Subsystem

The control subsystem 160 of the cart system 100 preferably facilitates control of the chassis subsystem 120, the tool 110, and/or the subsystems (e.g. the positioning control subsystem 140, the position holding subsystem 150, the lifting subsystem 170, the tilting subsystem 180, and/or any optional or alternative subsystems). The control subsystem 160 preferably has associated therewith control mechanisms (e.g. grips, levers, buttons, switches, dials, motorcycle throttle type controls, touch screen, or other types of known or yet to be discovered control mechanisms) to control at least some of the subsystems or mechanisms associated with the cart system 100. Control mechanisms may control one or more of the chassis subsystem 120, the tool 110, and/or the subsystems. There may be one control mechanism for each of the chassis subsystem 120, the tool 110, and/or the subsystems. Alternatively, a single control mechanism may control a plurality of the chassis subsystem 120, the tool 110, and/or the subsystems. For example, a computer 166 with a touch screen may control all the subsystems. Although one type of control mechanism is shown and described with a particular subsystem (chassis subsystem 120, tool 110, and/or the other subsystems), it should be noted that alternative control mechanisms could be used with one or more of the particular subsystems. Further, the shown and described location of a particular control mechanism is meant to be exemplary and not to limit the invention.

The shown control subsystem 160 includes the gripping handles 161 that may be adjustable in height, width (e.g. the between the gripping handles 161), and/or position to enable optimization of operator ergonomics. One way that this may be accomplished is by attaching the gripping handles 161 to the chassis subsystem 120 via gripping handle posts (e.g. metal tubes) that extend vertically from the chassis subsystem 120 in a manner similar to a bicycle seatpost through a bracket similar in design to a bicycle seatpost clamp ("gripping handle post clamps"). Together, the gripping handles 161, the gripping handle posts, and gripping handle post clamps, permit the operator to adjust the horizontal angle of the gripping handles 161 through 360 degrees and the height through a suitable range of heights to accommodate different operators. Additional adjustment structure (e.g. hinges, springs, ball joints) may allow further adjustment to the angle or range of the gripping handles 161. The shown gripping handles 161 preferably have associated vibration reduction mechanisms and materials (part of the vibration reduction subsystem 190).

The control subsystem 160 may also have braking mechanisms (shown as brake levers 162) associated with the gripping handles 161. The brake levers 162 allow the operator to control the locomotion subsystem 130 and/or the position holding subsystem 150. Put another way, the brake levers 162 may control the rolling motion of all wheels or other means of locomotion.

Figure 15:
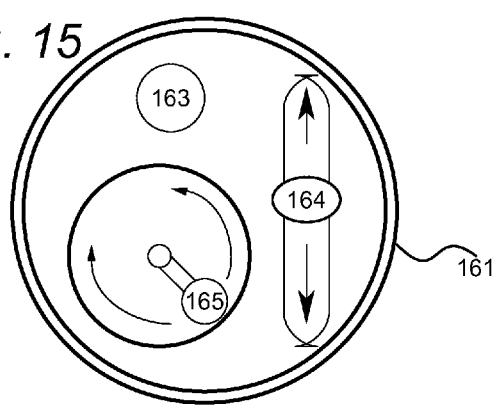
FIG. 15 is an end view of an exemplary gripping handle with actuators for various subsystems.

The control subsystem 160 may include a tool actuator 163 that allows the operator to control the tool 110 from the control subsystem 160. The tool actuator 163 shown in FIG. 15 is a button that can be pressed to turn the tool 110 on/off or held to control variable features of the tool 110 (e.g. how fast the tool 100 moves). The button could be replaced with alternative actuators including, but not limited to, levers, dials, sliders, and switches. The control subsystem 160 may also include a rate control for the lifting subsystem 170 to control the rate of raising and lowering of the lifting subsystem 170 and thereby the tool.

The control subsystem 160 may include a lifting subsystem actuator 164 that allows the operator to control the lifting subsystem 170 from the control subsystem 160. The lifting subsystem actuator 164 shown in FIG. 15 is a slider that can be pressed to turn the lifting subsystem 170 on/off, raised to raise the lifting subsystem 170, and lowered to lower the lifting subsystem 170. The button could be replaced with alternative actuators including, but not limited to, levers, dials, buttons, and switches.

The control subsystem 160 may include a tilting subsystem actuator 165 that allows the operator to control the tilting subsystem 180 from the control subsystem 160. The tilting subsystem actuator 165 shown in FIG. 15 is a joystick that can be pressed to turn the tilting subsystem 180 on/off and manipulated to achieve the appropriate angle of the tilting subsystem 180. The joystick could be replaced with alternative actuators including, but not limited to, levers, dials, buttons, sliders, and switches.

For some preferred exemplary cart systems 100, additional controls may operate other subsystems and/or optional features. For example, raising and lowering of the pivoting subsystem may be accomplished using control mechanisms (not shown) that may be associated with the control subsystem 160.

Figure 16:
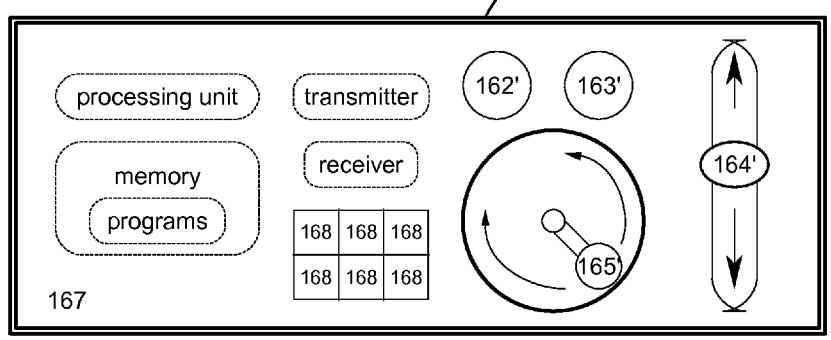
FIG. 16 is conceptual view of an exemplary control subsystem implemented as a computer.

The control subsystem 160 may be associated with the gripping handles 161 or not associated with the gripping handles 161. For example, the control subsystem 160 may be a "computer" 166 (FIG. 16) that is attached to or remote from the cart system 100. If the computer 166 is attached to the cart system 100, it may be attached to or incorporated into one or both of the handles 161, positioned between the handles 161, or positioned elsewhere on the chassis subsystem 120. Regardless of the positioning, the computer 166 preferably includes at least one associated "processing unit" and at least one associated "memory." The processing unit may be a processor (or other known or yet to be discovered processing device) that is capable of implementing steps or actions or directing (directly or indirectly) other components to implement steps or actions. Memory is any computer-readable storage media including non-transitory memory (e.g. RAM memory, flash memory, ROM memory, EPROM memory, EEPROM memory, registers, hard disk, a removable disk, a CD-ROM, a USB drive, or any other form of known or yet to be discovered storage media means). Exemplary programs may be implemented as software or other forms of computer instructions (e.g. computer-readable program code) that may be loaded into computer memory to produce a machine, such that the instructions that execute on the computer 166 create structures for implementing the steps, actions, or functions described herein. The computer 166 may be a specialized device or a general purpose computer (including a smart phone or personal digital assistant) with appropriate software loaded thereon. The computer 166 would preferably have the capability of sending signals to, for example, subsystems of the cart system 100 or the tool 110 and, therefore, may have a transmitter. (If the computer 166 has transmitters, the subsystems would have appropriate receivers (not shown) and mechanisms (not shown) for implementing the actions prescribed by the signals received from the transmitters.) The computer 166 may also have the capability of receiving signals (e.g. feedback) from, for example, subsystems of the cart system 100 or the tool 110 and, therefore, the computer 166 may have a receiver. Such feedback might be from sensors (not shown) that could provide information to be transmitted to the computer's receivers to inform the computer 166 and/or the operator that there is a problem. (If the computer 166 has receivers, the subsystems would have appropriate transmitters (not shown) and sensors (not shown) for providing information signals to be sent from the transmitters.) The computer 166 may have a touch screen 167 (or a more traditional display and separate input mechanisms such as a keyboard) with "virtual" control mechanisms thereon including, but not limited to, a brake controller 162', a tool controller 163', a lifting subsystem controller 164', and/or a tilting subsystem controller 165'. FIG. 16 also shows a plurality of controllers 168 that are meant to be exemplary of any controllers not shown elsewhere (and there could be similar additional controllers associated with the gripping handles 161). For example, one controller 168 may control the raising and lowering of the turn pivot 134. Another example is that the controllers 168 may control the various subsystems shown in FIG. 3.

In the shown exemplary cart system 100, both gripping handles 161 preferably have associated brake levers 162 similar to motorcycle hand brake levers to control the position holding subsystem 150. Either brake levers 162 can actuate the position holding subsystem 150 in a progressive fashion. Both brake levers 162 may incorporate ratchet locking mechanisms permitting the operator to lock the position holding subsystem 150 and prevent movement of the cart system 100 without the need to continuously maintain a grip. The left gripping handle 161 may incorporate a motorcycle throttle type control ("throttle control") that actuates a pneumatic valve progressively in proportion to the rotation of the throttle control in one direction permitting the operator to both actuate the lifting subsystem 170 and control the rate of lift by modulating the throttle control. This configuration permits smooth, rapid lifts when repositioning the tool 110. When this throttle control is turned in the direction opposite to that used to actuate the lifting subsystem 170, it actuates another pneumatic valve progressively in proportion to the rotation of the throttle control to release air contained in the lift cylinder (lift strut(s) 173) and permit a smooth descent of the tool 110 under the force of gravity. The right control gripping handle 161 may incorporate a throttle control that, when turned, actuates a pneumatic valve progressively and in proportion to the rotation of the throttle control to actuate the tool 110. This configuration permits smooth actuation of the tool 110 and modulation of its power output.

Vibration Reduction Subsystem

The vibration reduction subsystem includes a plurality of vibration isolation mechanisms (shown as exemplary vibration isolation mechanisms 191, 192, 193, 194, 195, but discussed generally as vibration reduction subsystem 190) that protect the operator from the harmful effects of vibration generated by tools 110. The vibration isolation mechanisms collectively work to eliminate (or at least minimize) the amount of vibration that is transmitted from the tool 110 to the operator and to dampen the frequencies most likely to cause injury. The shown and described vibration isolation mechanisms are meant to be exemplary. Although all the vibration isolation mechanisms may be used, some may be eliminated and others may be added. In preferred cart systems 100, the vibration isolation mechanisms will be tuned to work synergistically and thereby maximize the benefit.

Exemplary vibration isolation mechanisms include, but are not limited to, rubber, neoprene, para-aramid synthetic fiber (e.g. KEVLAR®), carbon fiber, and/or other appropriate material to best dampen the vibration transmitted to each subsystem in turn. Alternative vibration isolation mechanisms include, but are not limited to springs, shocks, or other known or yet to be discovered means for isolating vibration.

Vibration isolation mechanisms 191 (FIGS. 4 and 5) may be associated with structure (attachment subsystem 112) securing the tool 110 to the cart system 100. More specifically, the shown vibration isolation mechanisms 191 are incorporated into the dual support cradles 112a (shown in detail in FIG. 4) and on the rounded mount 112b (shown in detail in FIG. 5). The vibration isolation mechanisms 191 reduce the vibration transmitted from the tool 110 to the attachment subsystem 112.

Vibration isolation mechanisms 192 (FIG. 1) may be associated with the structure between the attachment subsystem 112 and the powered lifting subsystem 170. The vibration isolation mechanisms 192 may be vibration reduction mounts. The vibration isolation mechanisms 192 minimize the vibration transmitted from the attachment subsystem 112 to the powered lifting subsystem 170. The vibration reduction mounts incorporate rubber, neoprene, or other appropriate material or other structure to minimize transmitted vibration.

Vibration isolation mechanisms 193 (FIG. 1) may be associated with the structure between the powered lifting subsystem 170 and the cart system 100 (specifically the chassis subsystem 120). The vibration isolation mechanisms 193 may be rubber, neoprene or other appropriate material or structure. The vibration isolation mechanisms 193 minimize the vibration transmitted from the powered lifting subsystem 170 to the chassis subsystem 120.

Vibration isolation mechanisms 194 (FIG. 1) may be associated with the structure between the powered lifting subsystem 170 and tilting subsystem 180. There may also be vibration isolation mechanisms (not shown) at or near the intersection between the tilt guide 185 and the tilt support frame 181. There may also be vibration isolation mechanisms (not shown) at or near the intersection between the tilt guide 185 and the tilt brace 183 (e.g. on the interior of the tilt bracket 186 and/or between the tilt bracket 186 and the tilt brace 183). The vibration isolation mechanisms 194 may be rubber, neoprene or other appropriate material or structure. The vibration isolation mechanisms 194 minimize the vibration transmitted from the powered lifting subsystem 170 to the tilting subsystem 180.

Vibration isolation mechanisms 195 (FIGS. 1 and 2) may be associated with the gripping handles 161. The vibration isolation mechanisms 195 may be associated, for example, with the gripping handle attachment post and/or the gripping handle 161 and may take the form of vibration isolating mounts. The vibration isolation mechanisms 195 may be rubber, neoprene or other appropriate material or structure. The vibration isolation mechanisms 195 minimize the vibration transmitted from the cart system 100 to the operator.

The precise vibration isolation mechanisms used are preferably tailored to the application. Preferably these vibration isolation mechanisms will include materials or structure to optimize the vibration reduction achieved at each particular interface. Preferably the vibration isolation mechanisms work synergistically to maximize the elimination of vibration.

Method of Use

The cart system 100 may have many uses that can be inferred from the discussion herein. The following method is just one example, however, of a unique method of use that may be implemented by the operator.

Figure 17:
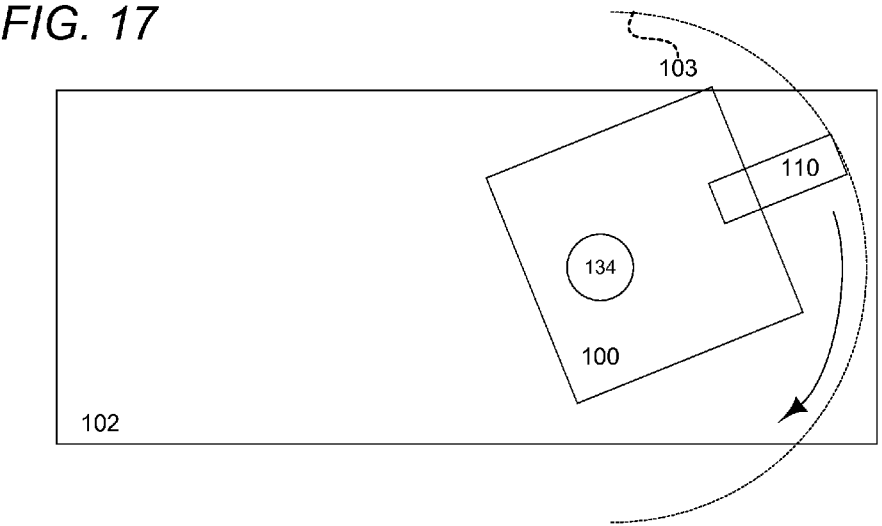
FIGS. 17-19 are plan schematic views of a cart system rotating about a turn pivot as the tool works on a first section of demolition.
Figure 18:
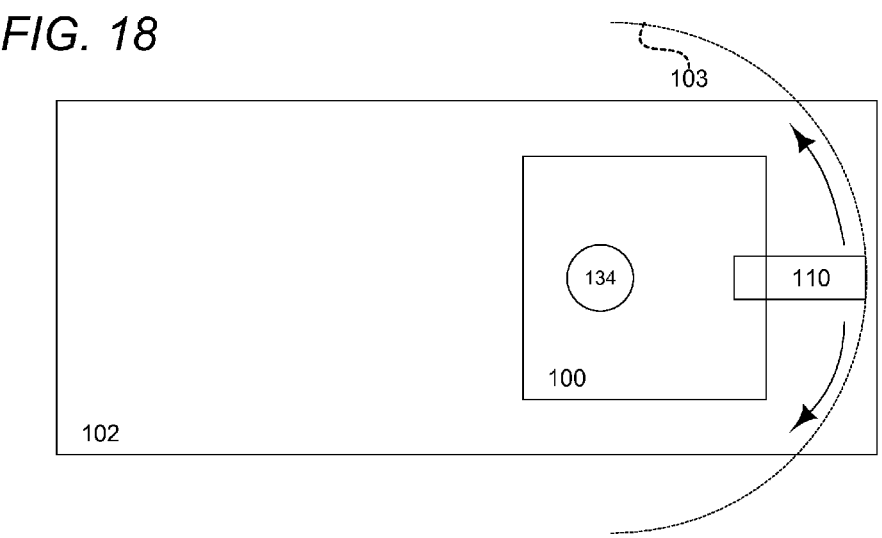
Figure 19:
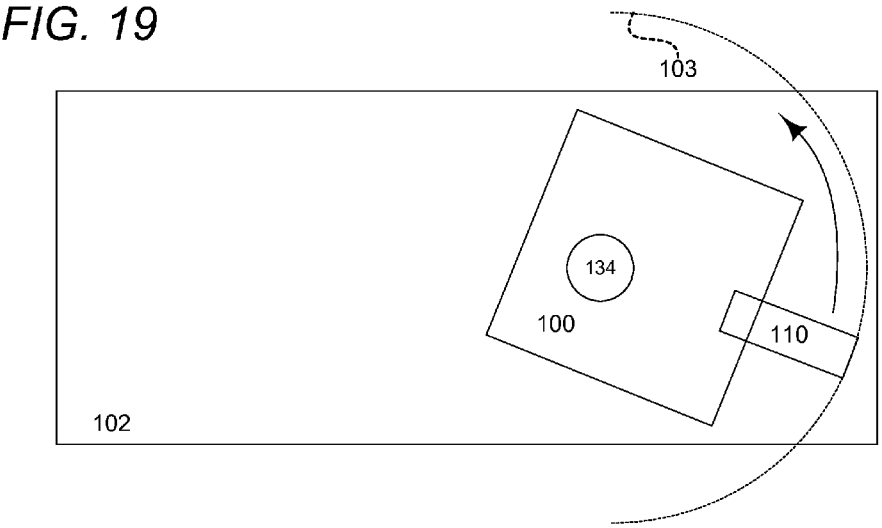
Figure 20:
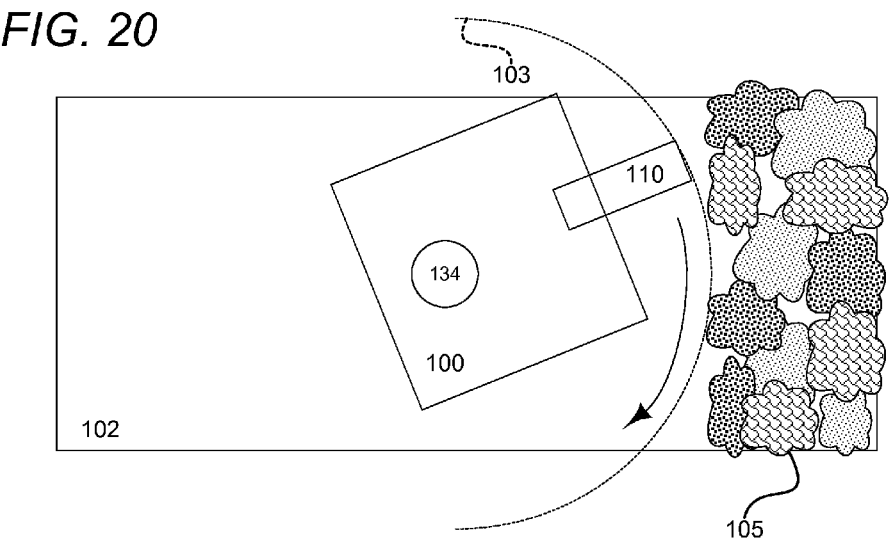
FIGS. 20-22 are plan schematic views of a cart system rotating about a turn pivot as the tool works on a second section of demolition, the first section of demolition being demolished.
Figure 21:
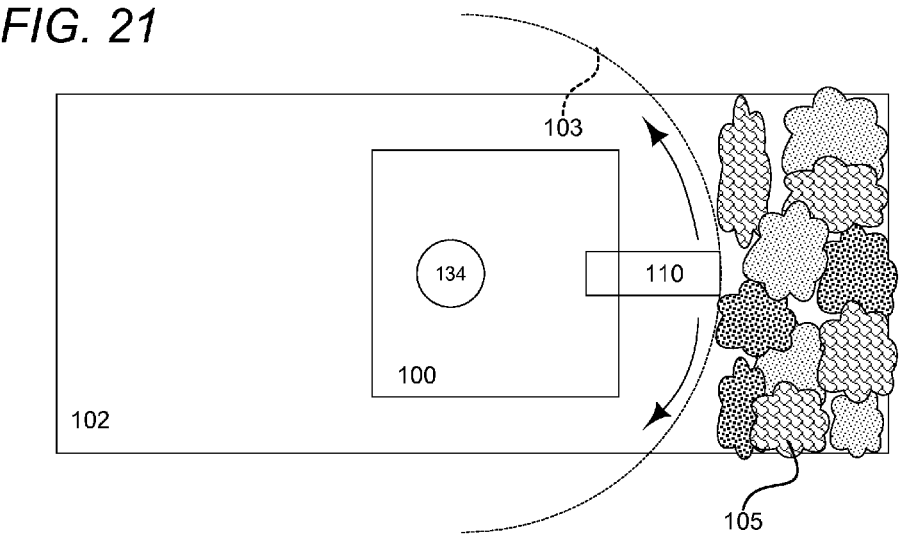
Figure 22:
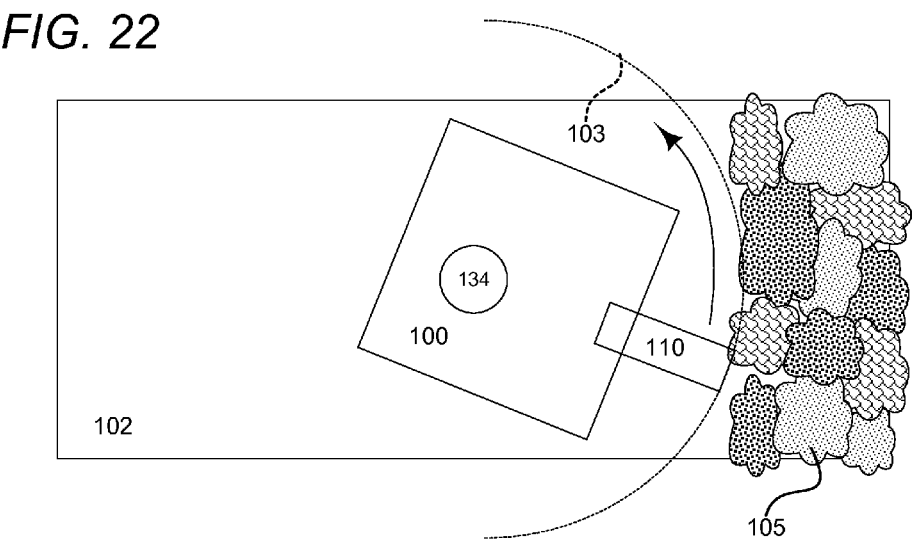

In use, an operator may position the cart system 100 in a location at which demolition is desired (the "demolition field 102"). As shown in FIGS. 17-19, the cart system 100 is preferably positioned at a far end (first position) of the demolition field 102. When the demolition for the first position is complete, the cart system 100 may be moved back to a second position such as that shown in FIGS. 20-22. Put another way, when the demolition for each position is complete, the cart system 100 may be moved back to a new position.

Although shown as a thin single dashed line in FIGS. 17-22, as shown in FIG. 23, the arc of demolition 103 is actually crated by all the radii between the central point of the turn pivot 134 and the working point of a tool 110. Using, for example, the lifting subsystem 170 and the tilting subsystem 180, the length of the radius can be lengthened and shortened so as to increase the depth of the arc of demolition 103. Radius 104a is shown as a minimum radius when the distance between the turn pivot 134 and the working point of a tool 110 is at its shortest. As the cart system 100 set at the minimum radius rotates (pivots) about the turn pivot 134, the minimum arc is followed. Radius 104b is shown as a maximum radius when the distance between the turn pivot 134 and the working point of a tool 110 is at its longest. As the cart system 100 set at the maximum radius rotates (pivots) about the turn pivot 134, the maximum arc is followed. The arc of demolition 103 would include all the points between the arc defined by the minimum radius and the arc defined by the maximum radius.

In use, an operator may position the cart system 100 in a location at which demolition is desired (the "demolition field 102"). As shown in FIGS. 17-19, the cart system 100 is preferably positioned at a far end (first position) of the demolition field 102. When the demolition for the first position is complete, the cart system 100 may be moved back to a second position such as that shown in FIGS. 20-22. Put another way, when the demolition for each position is complete, the cart system 100 may be moved back to a new position.

FIG. 24 shows an exemplary process that may be implemented manually or automatically. If the method steps are implemented automatically, they may be carried out according to a set of instructions written as a computer program that are uploaded onto a computer (e.g. computer 166) that directs control mechanisms to implement the steps. Put another way, computer program instructions may be loaded onto a computer to cause a series of operational steps to be performed on or by the cart system 100 and tool 110 to produce a computer implemented process such that the instructions that execute on the computer provide steps for implementing the functions specified in the flow chart block or blocks.

As shown in FIG. 24, the process starts at step 200. At step 200, N is set to one (1). At step 202, the cart system 100 is positioned at Position N of the demolition field 102. It should be understood that the demolition field 102 may be divided into multiple sections, each section having a position at which the cart system 100 will be placed. In the shown example, the first position (when N=1) is at the "far end" of the demolition field 102. The second position (N=2) moves towards the "close end." In practice, this would prevent the cart system 100 from having to travel over demolished portions of the demolition field 102 when the work is complete. Once in position, the turn pivot 134 would be lowered so that the cart system 100 could rotate about it. Step 204 shows that the cart system is rotated to an extreme first side of the arc of demolition 103. Step 206 shows that the radius is set at its maximum length (e.g. radius 104*b*). This may be accomplished using the lifting subsystem 170 and the tilting subsystem 180. At step 208, the tool 110 is activated. Step 210 and step 212 are the gradual process of reducing the length of the radius (the distance between the central point of the turn pivot 134 and the working point of a tool 110). As long as the minimum has not been reached, the length of the radius continues to be decreased. When the minimum radius has been reached, at step 214 a determination would be made as to whether the second side had been reached. If not, the tool would be deactivated (step 216) and the cart system 100 would be rotated toward the second side (step 218). The amount of rotation is being referred to as a "notch" which could be any predetermined distance, but preferably taking the working point of a tool 110 to a part of the demolition field 102 that has not been demolished. The method would then reset the radius at the maximum length and continue the process at step 206. On the other hand, if the second side had not been reached at step 214, the tool would be deactivated (step 220) and N would be increased by one (1) (step 220). It would then be determined whether the end of the demolition field 102 had been reached (step 222). If so, then the method would end (step 224). If not, then the cart system 100 would be repositioned at new position N (step 202) and the process would continue.

The process of FIG. 24 is based on a process in which the cart system 110 starts at one side of the arc of demolition 103 and changes the radius before moving toward the other side. A similar method would start at the maximum radius and work from one side of the arc of demolition 103 to the other side before decreasing the radius. Alternative patterns could also be used without affecting the scope of the invention.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A manipulation cart system for manipulating a tool, said cart system comprising:
   (a) a chassis subsystem;
   (b) a locomotion subsystem associated with said chassis subsystem, said locomotion subsystem including a turn pivot about which said cart system can pivot, said turn pivot including a turn pivot shaft and a turn pivot grip, said turn pivot shaft rotatable in relation to said turn pivot grip;
   (c) at least one manipulation subsystem associated with said chassis subsystem, said at least one manipulation subsystem for manipulating said tool;
   (d) at least one attachment subsystem for attaching said tool to said chassis subsystem; and
   (e) at least one control subsystem associated with said chassis subsystem, said at least one control subsystem for actuating said at least one manipulation subsystem;
   (f) wherein said cart system at least partially relieves physical demands of manipulating said tool and at least partially protects from stress-induced injuries associated with manipulating said tool.

2. The cart system of claim 1, said turn pivot being raisable and lowerable.

3. The cart system of claim 1 said turn pivot being raisable and lowerable using said at least one control subsystem.

4. The cart system of claim 1 said turn pivot being raisable and lowerable, wherein when said turn pivot is lowered it provides a pivot point about which said cart system can pivot such that said tool moves in an arc defined by a radius defined by said turn pivot and said tool.

5. The cart system of claim 1, said at least one attachment subsystem for attaching said tool to said chassis subsystem indirectly via said at least one manipulation subsystem, said at least one manipulation subsystem for manipulating said tool including at least one lifting subsystem for raising and lowering said tool and at least one tilting subsystem for tilting said tool.

6. The cart system of claim 1, said at least one attachment subsystem for attaching said tool to said chassis subsystem indirectly via said at least one manipulation subsystem, said at least one manipulation subsystem for manipulating said tool further comprising:
   (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
   (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace.

7. The cart system of claim 1, said at least one attachment subsystem for attaching said tool to said chassis subsystem indirectly via said at least one manipulation subsystem, said at least one manipulation subsystem for manipulating said tool further comprising:
   (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
   (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;
   (c) wherein said lift support frame is attached to said tilt support frame.

8. The cart system of claim 1, said at least one manipulation subsystem for manipulating said tool further comprising:
   (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
   (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;
   (c) wherein said lift support frame and said tilt support frame are the same support frame, said at least one attachment subsystem for attaching said tool to said chassis subsystem indirectly via said support frame.

9. The cart system of claim 1, further comprising a positioning control subsystem, said positioning control subsystem for selectively positioning said locomotion subsystem into at least three configurations including a free configuration, a first directional configuration, and a second directional configuration.

10. The cart system of claim 1,
    said at least one attachment subsystem for attaching said tool to said chassis subsystem indirectly via said at least one manipulation subsystem.

11. The cart system of claim 1,
    (a) said at least one manipulation subsystem for manipulating said tool including at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace; and
    (b) said at least one attachment subsystem for attaching said tool to said chassis subsystem indirectly via said at least one manipulation subsystem.

12. A manipulation cart system for manipulating a tool, said cart system comprising:
    (a) a chassis subsystem;
    (b) a locomotion subsystem associated with said chassis subsystem, said locomotion subsystem including a turn pivot about which said cart system can pivot, said turn pivot being raisable and lowerable;
    (c) at least one manipulation subsystem associated with said chassis subsystem, said at least one manipulation subsystem for manipulating said tool;
    (d) at least one attachment subsystem for attaching said tool to said chassis subsystem; and
    (e) at least one control subsystem associated with said chassis subsystem, said at least one control subsystem for actuating said at least one manipulation subsystem;
    (f) wherein said cart system at least partially relieves physical demands of manipulating said tool and at least partially protects from stress-induced injuries associated with manipulating said tool.

13. The cart system of claim 12, said turn pivot being raisable and lowerable using said at least one control subsystem.

14. The cart system of claim 12, wherein when said turn pivot is lowered it provides a pivot point about which said cart system can pivot such that said tool moves in an arc defined by a radius defined by said turn pivot and said tool.

15. The cart system of claim 12, said at least one attachment subsystem for attaching said tool to said chassis subsystem indirectly via said at least one manipulation subsystem, said at least one manipulation subsystem for manipulating said tool including at least one lifting subsystem for raising and lowering said tool and at least one tilting subsystem for tilting said tool.

16. The cart system of claim 12, said at least one attachment subsystem for attaching said tool to said chassis subsystem indirectly via said at least one manipulation subsystem, said at least one manipulation subsystem for manipulating said tool further comprising:
    (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
    (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace.

17. The cart system of claim 12, said at least one attachment subsystem for attaching said tool to said chassis subsystem indirectly via said at least one manipulation subsystem, said at least one manipulation subsystem for manipulating said tool further comprising:
    (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
    (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;
    (c) wherein said lift support frame is attached to said tilt support frame.

18. The cart system of claim 12, said at least one manipulation subsystem for manipulating said tool further comprising:
    (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;

(c) wherein said lift support frame and said tilt support frame are the same support frame, said at least one attachment subsystem for attaching said tool to said chassis subsystem indirectly via said support frame.

19. The cart system of claim 12, further comprising a positioning control subsystem, said positioning control subsystem for selectively positioning said locomotion subsystem into at least three configurations including a free configuration, a first directional configuration, and a second directional configuration.

20. A manipulation cart system for manipulating a tool, said cart system comprising:
(a) a chassis subsystem;
(b) a locomotion subsystem associated with said chassis subsystem, said locomotion subsystem including a turn pivot, said turn pivot being raisable and lowerable, wherein when said turn pivot is lowered it provides a pivot point about which said cart system can pivot such that said tool moves in an arc defined by a radius defined by said turn pivot and said tool;
(c) at least one manipulation subsystem associated with said chassis subsystem, said at least one manipulation subsystem for manipulating said tool;
(d) at least one attachment subsystem for attaching said tool to said chassis subsystem; and
(e) at least one control subsystem associated with said chassis subsystem, said at least one control subsystem for actuating said at least one manipulation subsystem;
(f) wherein said cart system at least partially relieves physical demands of manipulating said tool and at least partially protects from stress-induced injuries associated with manipulating said tool.

21. The cart system of claim 20, said at least one attachment subsystem for attaching said tool to said chassis subsystem indirectly via said at least one manipulation subsystem, said at least one manipulation subsystem for manipulating said tool including at least one lifting subsystem for raising and lowering said tool and at least one tilting subsystem for tilting said tool.

22. The cart system of claim 20, said at least one attachment subsystem for attaching said tool to said chassis subsystem indirectly via said at least one manipulation subsystem, said at least one manipulation subsystem for manipulating said tool further comprising:
(a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
(b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace.

23. The cart system of claim 20, said at least one attachment subsystem for attaching said tool to said chassis subsystem indirectly via said at least one manipulation subsystem, said at least one manipulation subsystem for manipulating said tool further comprising:
(a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
(b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;
(c) wherein said lift support frame is attached to said tilt support frame.

24. The cart system of claim 20, said at least one manipulation subsystem for manipulating said tool further comprising:
(a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
(b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;
(c) wherein said lift support frame and said tilt support frame are the same support frame, said at least one attachment subsystem for attaching said tool to said chassis subsystem indirectly via said support frame.

25. The cart system of claim 20, further comprising a positioning control subsystem, said positioning control subsystem for selectively positioning said locomotion subsystem into at least three configurations including a free configuration, a first directional configuration, and a second directional configuration.

26. A manipulation cart system for manipulating a tool, said cart system comprising:
(a) a chassis subsystem;
(b) a locomotion subsystem associated with said chassis subsystem;
(c) at least one manipulation subsystem associated with said chassis subsystem, said at least one manipulation subsystem for manipulating said tool;
(d) at least one attachment subsystem for attaching said tool to said chassis subsystem;
(e) at least one control subsystem associated with said chassis subsystem, said at least one control subsystem for actuating said at least one manipulation subsystem; and
(f) a positioning control subsystem, said positioning control subsystem for selectively positioning said locomotion subsystem into at least three configurations including a free configuration, a first directional configuration, and a second directional configuration;
(g) wherein said cart system at least partially relieves physical demands of manipulating said tool and at least partially protects from stress-induced injuries associated with manipulating said tool.

27. The cart system of claim 26, said locomotion subsystem including a turn pivot about which said cart system can pivot.

28. The cart system of claim 26, said at least one attachment subsystem for attaching said tool to said chassis subsystem indirectly via said at least one manipulation subsystem, said at least one manipulation subsystem for manipulating said tool including at least one lifting subsystem for raising and lowering said tool and at least one tilting subsystem for tilting said tool.

29. The cart system of claim 26, said at least one attachment subsystem for attaching said tool to said chassis subsystem indirectly via said at least one manipulation subsystem, said at least one manipulation subsystem for manipulating said tool further comprising:
 (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
 (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace.

30. The cart system of claim 26, said at least one attachment subsystem for attaching said tool to said chassis subsystem indirectly via said at least one manipulation subsystem, said at least one manipulation subsystem for manipulating said tool further comprising:
 (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
 (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;
 (c) wherein said lift support frame is attached to said tilt support frame.

31. The cart system of claim 26, said at least one manipulation subsystem for manipulating said tool further comprising:
 (a) at least one lifting subsystem for raising and lowering said tool, said at least one lifting subsystem having a lift support frame, a lift telescoping element, and at least one lift strut, said lift strut for raising and lowering said telescoping element in relation to said lift support frame; and
 (b) at least one tilting subsystem for tilting said tool, said at least one tilting subsystem having a tilt support frame, a tilt brace, a tilt pivot, a tilt guide, a tilt bracket, and a tilt lock, said tilt support frame tilting about said tilt pivot relative to said tilt brace;
 (c) wherein said lift support frame and said tilt support frame are the same support frame, said at least one attachment subsystem for attaching said tool to said chassis subsystem indirectly via said support frame.

* * * * *